(12) United States Patent
Royer

(10) Patent No.: US 10,917,762 B2
(45) Date of Patent: Feb. 9, 2021

(54) COMMUNICATIONS SYSTEM WITH COMMON ELECTRONIC INTERFACE

(71) Applicant: CHALLENGE STAR LLC, New York, NY (US)

(72) Inventor: Jed Royer, Miami, FL (US)

(73) Assignee: Challenge Star LLC, New York, NY (US)

( * ) Notice: Subject to any disclaimer, the term of this patent is extended or adjusted under 35 U.S.C. 154(b) by 21 days.

(21) Appl. No.: 15/718,557

(22) Filed: Sep. 28, 2017

(65) Prior Publication Data

US 2018/0098205 A1    Apr. 5, 2018

Related U.S. Application Data

(63) Continuation-in-part of application No. 15/283,257, filed on Sep. 30, 2016, now Pat. No. 10,560,402.

(51) Int. Cl.

| H04W 4/21 | (2018.01) |
|---|---|
| H04W 4/14 | (2009.01) |
| G06F 3/0481 | (2013.01) |
| H04L 29/08 | (2006.01) |
| G06F 16/29 | (2019.01) |
| G06F 16/9537 | (2019.01) |
| H04W 4/029 | (2018.01) |
| G06Q 10/10 | (2012.01) |
| G06Q 10/02 | (2012.01) |
| G06Q 50/00 | (2012.01) |
| G06F 3/0482 | (2013.01) |

(52) U.S. Cl.
CPC ............ *H04W 4/21* (2018.02); *G06F 3/0482* (2013.01); *G06F 3/04817* (2013.01); *G06F 16/29* (2019.01); *G06F 16/9537* (2019.01); *G06Q 10/02* (2013.01); *G06Q 10/10* (2013.01); *G06Q 50/01* (2013.01); *H04L 67/18* (2013.01); *H04W 4/029* (2018.02); *H04W 4/14* (2013.01)

(58) Field of Classification Search
CPC ........ H04L 51/36; H04L 67/22; H04L 51/00; H04L 51/20; H04L 51/32; H04L 61/1594; H04L 67/18; H04L 65/40; H04L 67/24; G06Q 10/109; G06Q 10/10; G06Q 10/02; G06Q 50/01; H04W 68/005; H04W 4/21; H04W 4/021; H04W 4/029; H04W 4/14; H04W 4/02; G06F 3/0482; G06F 16/29; G06F 16/9537; G06F 3/04817
See application file for complete search history.

(56) References Cited

U.S. PATENT DOCUMENTS

| 2010/0022225 A1* | 1/2010 | Benger ................. G06Q 10/109 455/414.1 |
| 2012/0302258 A1* | 11/2012 | Pai .......................... H04W 4/02 455/456.2 |
| 2013/0151637 A1* | 6/2013 | Bedikian ................. H04L 67/22 709/206 |

(Continued)

*Primary Examiner* — Jason D Recek
*Assistant Examiner* — Ranjan Pant
(74) *Attorney, Agent, or Firm* — The Law Firm of AQ Basit

(57) ABSTRACT

A device includes a processor. The processor receives a user device's geographic location. The processor further discovers an event that is electronically registered with an electronic application. The processor further sends a first electronic message to the user device. The first electronic message includes an electronic list and the event's geographic location.

19 Claims, 21 Drawing Sheets

(56) References Cited

U.S. PATENT DOCUMENTS

| | | | | |
|---|---|---|---|---|
| 2013/0176895 A1* | 7/2013 | McEachern | ............ | H04L 12/56 |
| | | | | 370/254 |
| 2013/0298038 A1* | 11/2013 | Spivack | ............... | H04L 65/403 |
| | | | | 715/753 |
| 2013/0326221 A1* | 12/2013 | Murphy | ............... | H04L 63/123 |
| | | | | 713/168 |
| 2014/0143357 A1* | 5/2014 | Reitnour | .......... | G06F 15/17306 |
| | | | | 709/206 |
| 2014/0229898 A1* | 8/2014 | Terwedo | ............ | G06F 3/04842 |
| | | | | 715/835 |
| 2015/0002294 A1* | 1/2015 | Delia | ...................... | H04B 1/38 |
| | | | | 340/539.17 |
| 2015/0046576 A1* | 2/2015 | Taniguchi | .............. | A63F 13/35 |
| | | | | 709/223 |
| 2015/0088622 A1* | 3/2015 | Ganschow | ......... | G06Q 30/0252 |
| | | | | 705/14.5 |
| 2015/0248651 A1* | 9/2015 | Akutagawa | ........ | G06Q 10/1095 |
| | | | | 705/7.19 |
| 2015/0358390 A1* | 12/2015 | Starr | ...................... | H04L 67/06 |
| | | | | 709/204 |
| 2016/0050289 A1* | 2/2016 | Cohen | .................... | H04L 67/30 |
| | | | | 709/204 |
| 2016/0071325 A1* | 3/2016 | Callaghan | ............. | G06F 3/0346 |
| | | | | 345/633 |
| 2016/0135014 A1* | 5/2016 | Alharayeri | ............. | H04W 4/21 |
| | | | | 455/456.3 |
| 2017/0118165 A1* | 4/2017 | Kumar | ................ | G06F 16/9537 |
| 2018/0145840 A1* | 5/2018 | Advani | .................. | H04L 51/32 |

\* cited by examiner

| ID/PASSWORD (502) | PSEUDONYM (504) | ICON DISPLAY CODE (506) | ID OF OTHER USERS (508) |
|---|---|---|---|
| JOHN/A8TI* | JELLY BABY | 78YY | TIMJO, LARUH |
| KARLI/UU89 | | 85UI | JOHBE, TINSM |
| DARREN/5X | THE BRAIN | 8UI, 78YY | |
| ● ● | ● ● | ● ● | ● ● |

# COMMUNICATIONS SYSTEM WITH COMMON ELECTRONIC INTERFACE

BACKGROUND

Various computer applications allow for multiple individuals to interact with each other by using various technological process that use electronic text, video, and audio messaging systems. However, these particular computer applications do not allow for a user of a computing device to interact with other users who may be using a computer application unless the user of the computing device is also associated with that particular computer application.

BRIEF DESCRIPTION OF DRAWINGS

FIG. 5 is an example database structure that stores electronic authentication information;

DETAILED DESCRIPTION OF PREFERRED EMBODIMENTS

Figure 1:
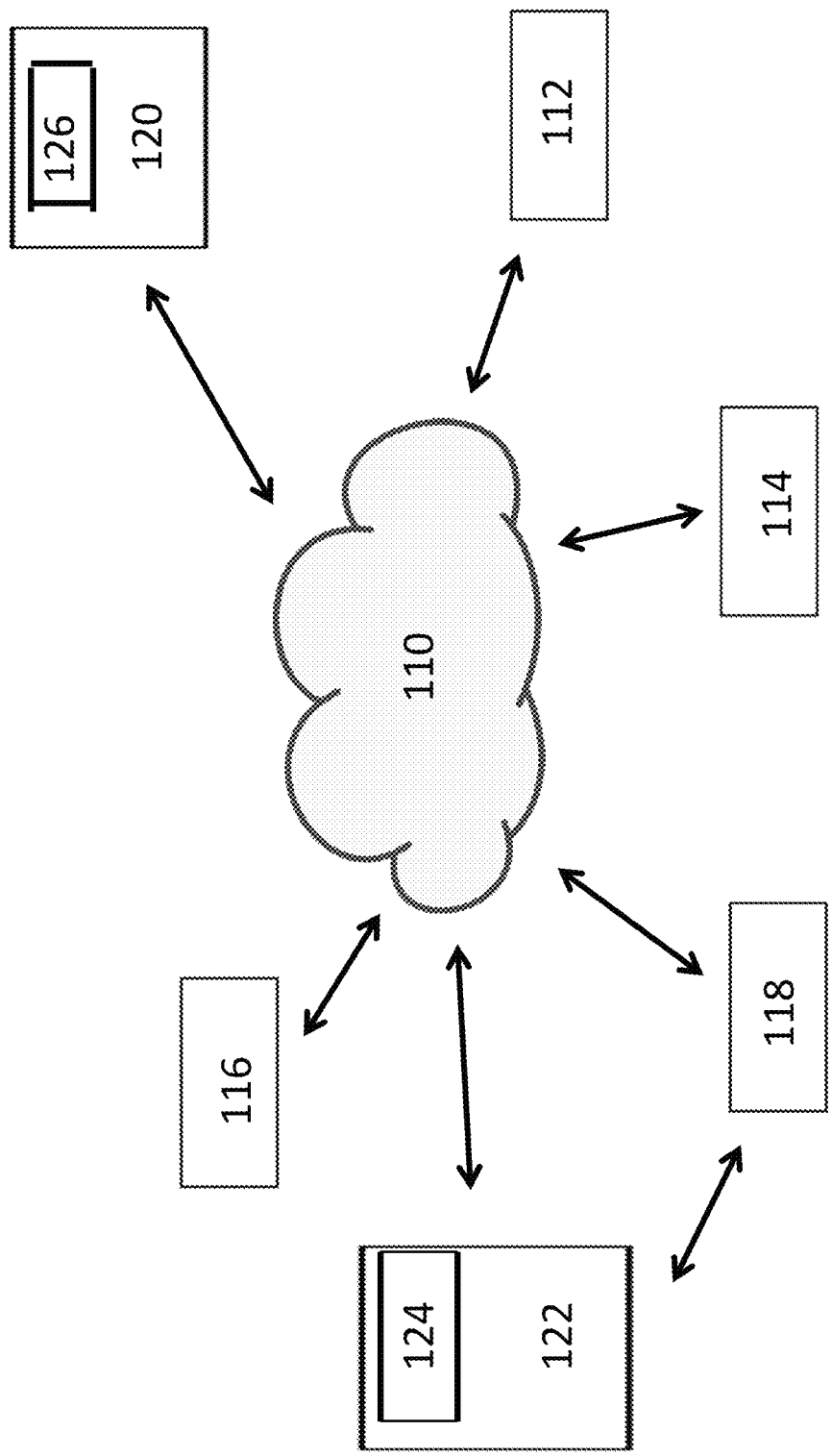
FIG. 1 is a diagram of an example environment in which systems and/or methods described herein may be implemented.

The following detailed description refers to the accompanying drawings. The same reference numbers in different drawings may identify the same or similar elements.

Systems, devices, and/or methods described herein may allow for a user, using an electronic application implemented on a computing device (e.g., smartphone, laptop, etc.), to interact with users on another electronic application without the user having to log into an electronic login page within the other electronic application. For example, a user, using a computing device, may electronically search events in a particular geographic region, receive an electronic message, and/or scan a barcode to participate in an event. For example, the event may be a real life event such as a presentation, a social event (e.g., an art gallery opening, a cocktail reception, etc.), or any other event that includes the participation of one or more individuals. Alternatively, the event may be an electronic communications event, such as a webinar, a real-time video conference, or any other event that utilizes electronic communications to bring one or more individuals to experience the same electronic communications event.

If the user has received an electronic message to participate in the event, the user has the option to participate in the event or not to participate in the event. If the user decides to participate in the event, the user may be asked to provide electronic information within an electronic application. In embodiments, the electronic information may include login credentials that are associated with another electronic application that is different than the electronic application that requires electronic information for participation in the event.

In embodiments, the login credentials may include a username and/or a password. Furthermore, the login credentials may include an indication which other electronic application is associated with the username and/or password. Once the user has successfully logged into the electronic application, the user may receive an acknowledgement that the user is registered for the event. In embodiments, before, during and/or after the event, the user's username, or an alternative identifier, is displayed on an electronic list to the user that also includes the usernames of other users who are also participating in the event. In embodiments, each identifier on the list may also include an icon or graphical indicator that is associated with another electronic application.

Rather than logging into the electronic application, such as using login information (e.g., associated with another electronic application), the user may participate in an event by searching for an event. In embodiments, the user may provide permission to the electronic application to determine the user's geographic location via the user device's location (e.g., the user device that is at the same physical location as the user). By doing so, the electronic application may determine the user's location and determine the location of one or more events within a particular geographic area (e.g., within two miles, five miles, 10 miles, a particular city, county, etc.). Thus, the electronic application may send electronic information (displayed on the user device) about any events within a particular distance of the user's (based on the user device's geographic location) geographic location. In embodiments, the events may be provided as a list or within an electronic map displayable on the user device.

In embodiments, the user may select an event from the electronic list and generate an electronic communication that results in the display of electronic information about the event. In embodiments, the user may then choose to participate in the event by providing electronic information about another electronic application and electronically communicate with one or more other participants of the event who may have logged into the electronic application with electronic information (e.g., password, user name, etc.) information associated with another electronic application. Additionally, or alternatively, the user may use the geographic information by physically going to the event and scanning a barcode that allows the user to electronically communicate with one or more other participants of the event.

Accordingly, in embodiments, once the user is associated with the event, the user may select the icon next to another user's identifier and the selection of the icon may result in automatically changing the display of the computing device to display the other electronic application associated with the other user. Furthermore, the user may automatically become electronically connected to the other user, allows the user to electronically communicate with the other user via the other application, and cause electronic updates within the other electronic application. As a result, the user is able to (1) provide geographic location and/or authentication login information associated with a first electronic application to access a second electronic application; (2) receive electronic information that describes multiple users who have used the second electronic application; (3) receive additional electronic information, such as an icon, that describes each of the multiple users and their association with one or more other electronic applications; and (4) permit the user to electronically communicate with the one or more electronic applications by selecting one of the additional electronic information.

As such, a user, using a computing device, can electronically interact with other users within a particular electronic application without the user having to electronically log into an electronic login page that is generated by the particular electronic application. In doing so, the user can increase the number of electronic communications with a greater number of other users within the particular electronic application. Also, users can find other users who have shared common experiences without having to perform additional electronic communications and use additional computing memory and resources to search for other such users. Furthermore, the user can decrease the number of electronic communications necessary to access an electronic application prior to electronically communicating with other users. Thus, there is a reduction in the number of login electronic interactions and, as a result, a reduction in computer memory storage associated with the reduced number of login electronic interactions. Furthermore, there is an increase in the number of electronic communications being performed by multiple users who are associated with a particular event. Additionally, determining the geographic location to find events may reduce the number of electronic communications of one type (e.g., searching for different events via a computing device) and increase electronic communications of another type (e.g., electronically communicating with other participants of an event that a user is electronically registered to attend).

FIG. 1 is a diagram of example environment 100 in which systems, devices, and/or methods described herein may be implemented. FIG. 1 shows network 110, user device 112, user device 114, user device 116, application server 118, server 120, computing device 122, electronic application 124, and electronic application 126.

Network 110 may include a local area network (LAN), wide area network (WAN), a metropolitan network (MAN), a telephone network (e.g., the Public Switched Telephone Network (PSTN)), an ad hoc network, an intranet, the Internet, a satellite network, a GPS network, a fiber optic-based network, and/or combination of these or other types of networks. Additionally, or alternatively, network 110 may include a cellular network, a public land mobile network (PLMN), a second generation (2G) network, a third generation (3G) network, a fourth generation (4G) network, a fifth generation (5G) network, and/or another network. In embodiments, network 110 may allow for devices describe in FIGS. 1 and 2 to electronically communicate (e.g., using emails, electronic signals, URL links, web links, electronic bits, fiber optic signals, wireless signals, wired signals, etc.) with each other so as to send and receive various types of electronic communications.

User device 112, 114, and/or 116 may include any computation or communications device that is capable of communicating with a network (e.g., network 110). For example, user device 112, user device 114, or user device 116 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a desktop computer, a laptop computer, a tablet computer, a camera, a personal gaming system, a television, a set top box, a digital video recorder (DVR), or another type of computation or communications device.

User device 112, 114, and/or 116 may receive and/or display content. The content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream). In embodiments, an electronic application may use an electronic graphical user interface to display content and/or information via user device 112, 114, and/or 116. User device 112, 114, and/or 116 may have a touch screen and/or a keyboard that allows a user to electronically interact with an electronic application. In embodiments, a user may swipe, press, or touch user device 112, 114, and/or 116 in such a manner that one or more electronic actions will be initiated by user device 112, 114, and/or 116 via an electronic application.

User device 112, 114, and/or 116 may include a variety of applications, such as, for example, an e-mail application, a telephone application, a camera application, a video application, a multi-media application, a music player application, a visual voice mail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.).

Application Server 118 may include one or more computational or communications devices that gather, process, store, and/or provide information relating to one or more web pages or electronic pages associated with electronic application 124 that is searchable and viewable over network 110. While FIG. 1 shows a single application server 118 there may be additional application servers 118 associated with electronic application 124.

Server 120 may include one or more computational or communication devices that gather, process, store, and/or provide information relating to one or more web pages or electronic pages associated with electronic application 126 that is searchable and viewable over network 110. While FIG. 1 shows a single server 120 there may be additional servers 120 associated with one or more electronic applications 126. Computing device 122 may include any computation or communications device that is capable of communicating with a network (e.g., network 110). For example, computing device 122 may include a smart phone, a desktop computer, a laptop computer, a tablet computer, or another type of computation or communications device.

Electronic application 124 may be capable of interacting with application server 118, server 120, computing device 122, and/or electronic application 126 to generate an electronic list that allows communications between different electronic applications without having the need for the users, using user devices 112, 114, and/or 116, to log into electronic application 126 for an initial electronic communication between the users. In embodiments, electronic application 124 may be electronically configured and designed by using computing device 122. In embodiments, electronic application 124 may interact with application programming interfaces (APIs) to obtain electronic information from other electronic applications, such as electronic application 126. In embodiments, electronic application 124 may be electronically configured to show photos, video, text, icons, graphical images, buttons, emojis, and/or any other electronic information. In embodiments, electronic application 124 may electronically send/receive electronic information to/from application server 120 to determine how a particular electronic list, associated with an event, should be displayed. In embodiments, electronic application 124 may electronically send/receive electronic information to/from electronic application 126 so as to allow a user, using electronic application 124, to interact with a user of electronic application 126 without the user, using electronic application 124, from having to login into electronic application 126 within an electronic page of electronic application 126.

Electronic application 126 may be an application that is generated and used only on computing devices, such as user device 112, 114, or 116. In embodiments, electronic application 126 can be a social networking application that allows users who may know each other to electronically interact via electronic application 126. In embodiments, electronic application 126 can be a business networking application that allows users who may know each other to electronically interact via electronic application 126. In embodiments, electronic application 126 can be a communications platform application or any other type of application that allows users to electronically communicate with each other by using text, photos, and/or video content. While FIG. 1 shows electronic application 126, there may be multiple different type of electronic applications 126 that each have their own server(s) that are similar to server 120.

Figure 2:
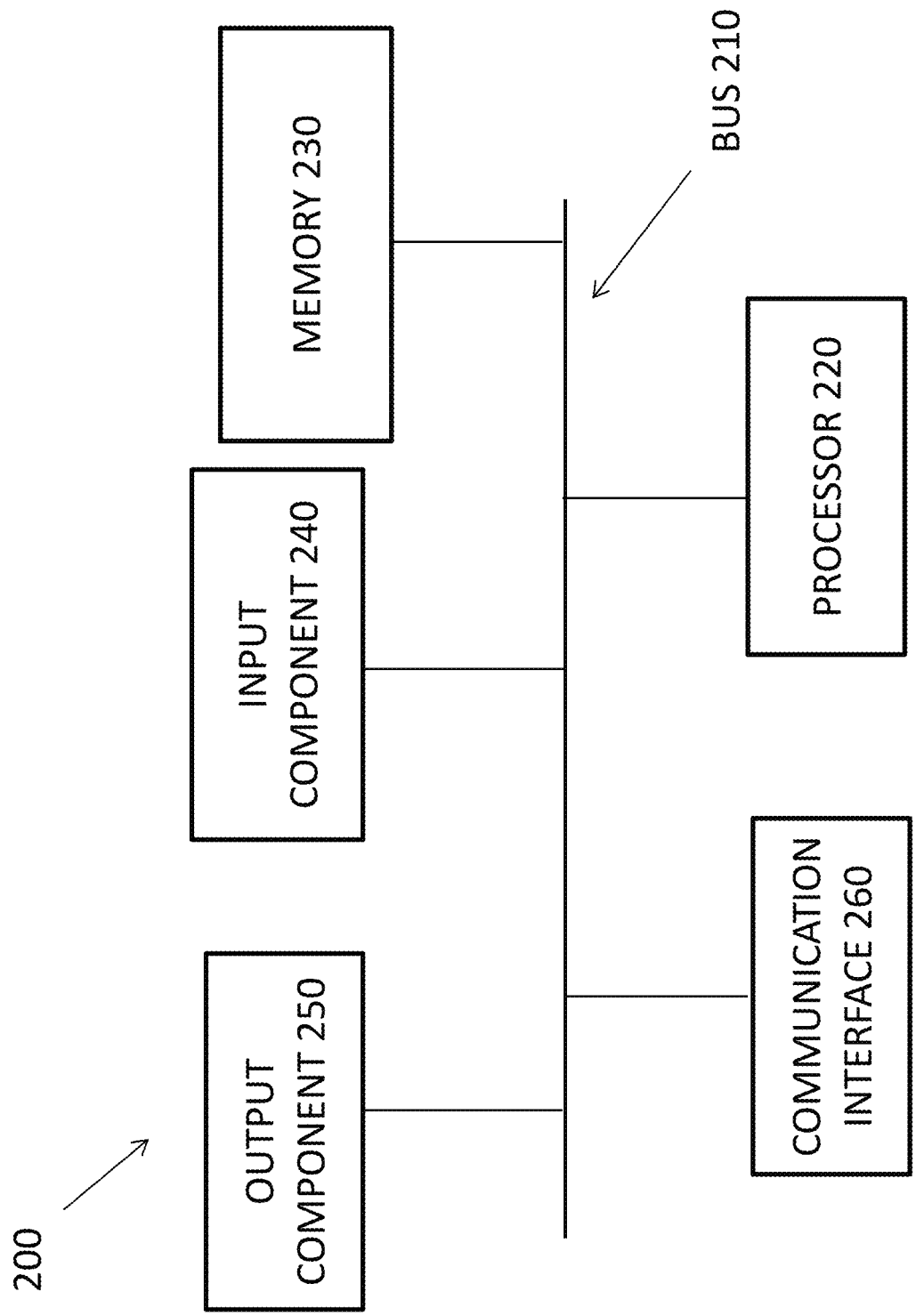
FIG. 2 is a diagram of an example computing device.

FIG. 2 is a diagram of example components of a device 200. Device 200 may correspond to user device 112, 114, 116, application server 118, server 120, and computing device 122. Alternatively, or additionally, user device 112, 114, 116, application server 118, server 120, and computing device 122 may include one or more devices 200 and/or one or more components of device 200.

As shown in FIG. 2, device 200 may include a bus 210, a processor 220, a memory 230, an input component 240, an output component 250, and a communications interface 260. In other implementations, device 200 may contain fewer components, additional components, different components, or differently arranged components than depicted in FIG. 2. Additionally, or alternatively, one or more components of device 200 may perform one or more tasks described as being performed by one or more other components of device 200.

Bus 210 may include a path that permits communications among the components of device 200. Processor 220 may include one or more processors, microprocessors, or processing logic (e.g., a field programmable gate array (FPGA) or an application specific integrated circuit (ASIC)) that interprets and executes instructions. Memory 230 may include any type of dynamic storage device that stores information and instructions, for execution by processor 220, and/or any type of non-volatile storage device that stores information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc.

Communications interface 260 may include any transceiver-like mechanism that enables device 200 to communicate with other devices and/or systems. For example, communications interface 260 may include an Ethernet interface, an optical interface, a coaxial interface, a wireless interface, or the like.

In another implementation, communications interface 260 may include, for example, a transmitter that may convert baseband signals from processor 220 to radio frequency (RF) signals and/or a receiver that may convert RF signals to baseband signals. Alternatively, communications interface 260 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 260 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communications interface 260 and transmit the RF signals over the air, and receive RF signals over the air and provide the RF signals to communications interface 260. In one implementation, for example, communications interface 260 may communicate with network 110.

As will be described in detail below, device 200 may perform certain operations. Device 200 may perform these operations in response to processor 220 executing software instructions (e.g., computer program(s)) contained in a computer-readable medium, such as memory 230, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
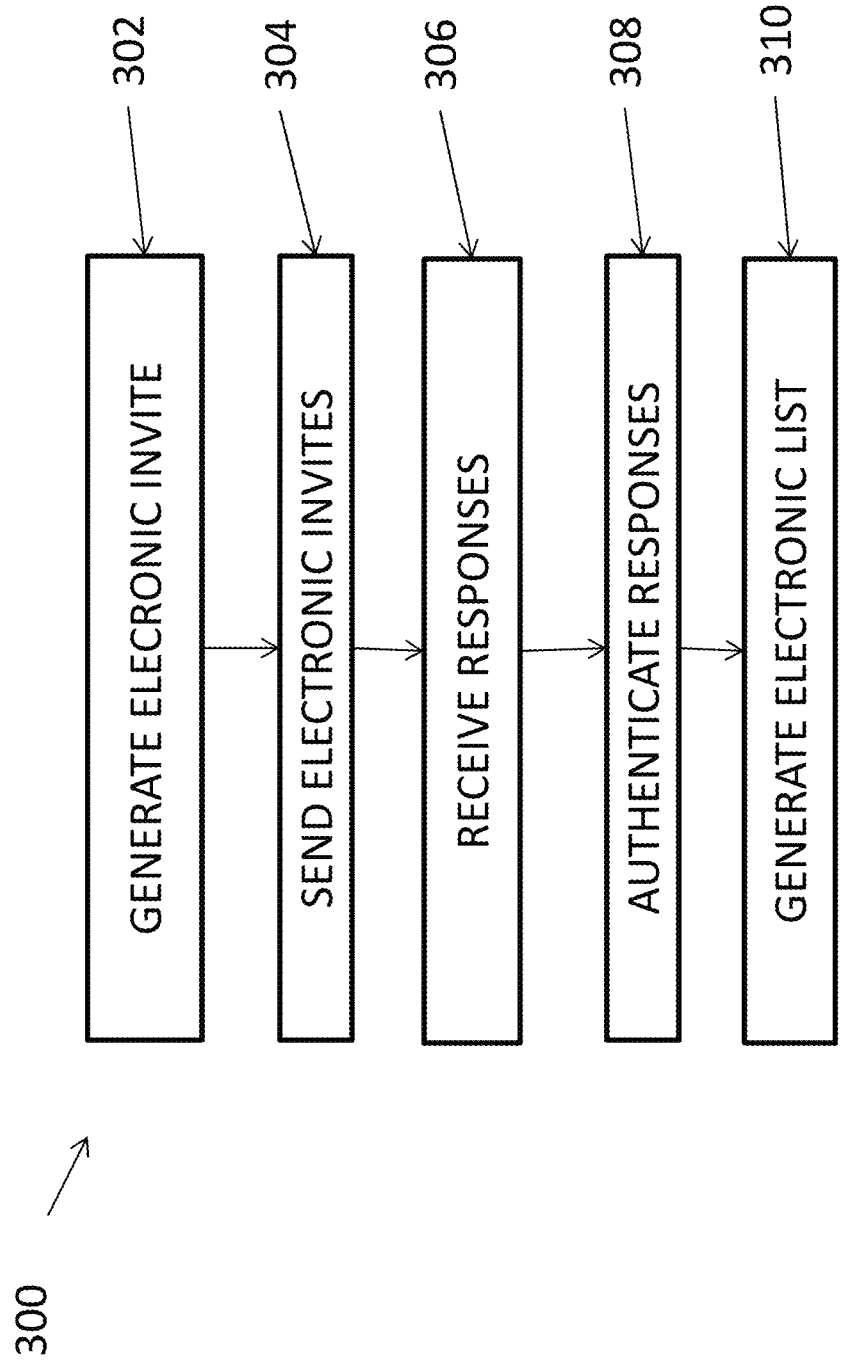
FIG. 3 is a flow chart of an example process for sending and receiving electronic communications from a computing device.

FIG. 3 is a flow chart of an example process 300 for generating a common electronic communications page. In embodiments, example process 300 may be performed by electronic application 124 using application server 118, computing device 122, and/or other electronic applications and devices as described in FIG. 1.

At step 302, electronic application 124 is used to generate an electronic invite. In embodiments, the electronic invite may have one or more electronic pages. For example, there may be an electronic introduction/title page and another electronic page displaying all the individuals participating in the event. In embodiments, a user, using computing device 122, may determine the electronic graphical display of the electronic invite page and also determine what information is to be requested by other users who will use the electronic guest page, within electronic application 124, to show their intent to participate in an event. In embodiments, electronic application 124 may only allow the user to enter the name of the event, the location of the event, and the time/date of the event. In alternate embodiments, electronic application 124 may allow the user to enter photos, videos, text, font/size of text to the electronic guest page. In other alternate embodiments, the user may enter email, phone numbers, or any other communications information that allows for electronic application 124 to send the electronic guest page to other users. In embodiments, the user can also determine what electronic information may be displayed in an electronic list. For example, the user can determine the type of electronic information displayed about a participant in an event, and the types of electronic selections that allow different users to interact with usernames listed on the electronic list. In embodiments, the user can also determine who can and cannot view the list (e.g., only those who participate, other groups of users, etc.). In embodiments, the user can also decide whether electronic tokens, bits, etc. can be transferred between electronic application 124 and electronic application 126.

In embodiments, the user may enter electronic information associated with a geographic location (e.g., an electronic tag or link with electronic geographic information) that may be used by electronic application 124 to display electronic information about the event to other users of electronic application 124. Thus, the geographic location may be used by other users of electronic application 124 to electronically discover the event and to participate as further described in FIGS. 17 and 18. In embodiments, the user may enter electronic information associated with a barcode that may be used by other users, using electronic application 124 on other user devices, to participate in an event by electronically scanning the barcode as further described in FIGS. 19 and 20.

At step 304, electronic application 124 sends the electronic invite to other users for display on their user devices (e.g., user device 112, 114, and/or 116 as described in FIG. 1). In embodiments, the electronic invite may be automatically sent by computing device 122 based on electronic information inputted into electronic application 124. In alternate embodiments, the electronic invite may be sent based on receiving a request from a user, using user device 112, 114, or 116. For example, a user may obtain information about an event (e.g., advertised on a billboard, displayed by an electronic web page, etc.) and may decide to visit an electronic web page associated with the event. As such, the electronic web page may include an electronic link that, when selected by the user, displays the electronic invite within electronic application 124. In embodiments, electronic application 124 may send the electronic invite and/or electronically download a link (e.g., a hyperlink) to download electronic application 124 to one or more user devices, such as user device 112, 114, and/or 116. In embodiments, once user device 112, 114, and/or 116 receive the electronic invite or a download of electronic application 124, a user of user device 112, 114, and/or 116 may enter login information as described further in FIG. 4.

At step 306, electronic application 124 may receive an electronic response associated with an event. In embodiments, the electronic response may include a participant's name, an identifier (e.g., a pseudonym), an email address, a phone number, and/or login information associated with another electronic application, such as electronic application 126. In embodiments, the login information may include a username and password. In alternate embodiments, a user may use biometric information (e.g., voice, face recognition, finger prints, eye pattern recognition, etc.) to log into electronic application 124.

At step 308, electronic application 124 may send the login information to electronic application 126. In embodiments, electronic application 126 may authenticate the login information and send an electronic message to electronic application 124 that the username and password or any other information is valid. In embodiments, the login information may be authorized by electronic application 124 sending the login information to server 120 and/or electronic application 126. In embodiments, electronic application 124 may receive, at a later time, updated login information associated with a different electronic application 126 for the same user. Thus, electronic application 124 may send the updated login for authentication to server 120 and/or electronic application 126. In embodiments, electronic application 124 may store electronic information associated with that particular participant in a database, such as database 500 described in FIG. 5. In embodiments, electronic information, associated with a user of electronic application 124, may be automatically corrected based on stored information of the user by electronic application 124 and/or application server 118. In embodiments, the automatic correction may be of a user's name and/or electronic contact information (e.g., email address, phone number, username, etc.) that is associated with electronic application 124 and/or electronic application 126. Additionally, electronic application 124 may automatically correct information associated with other electronic applications, such as electronic application 126, that may be also be displayed on an electronic list (as further described in step 310). Thus, the correct electronic information may be viewed rather than electronic information that is not correct.

At step 310, electronic application 124 may generate an electronic list. In embodiments, the electronic list may be generated based on each participant's login information associated with electronic application 126. In embodiments, the electronic list may be generated based on the electronic information stored in database 500 as described in FIG. 5. In embodiments, the electronic list may be displayed on a user device (e.g., user device 112, 114, and/or 116) to show (i) each event participant's name or pseudonym; and (ii) one or more icons and/or graphical logos associated with one or more other different electronic applications, such as electronic application 126.

In embodiments, the electronic list may display each participant's photo or a graphical image that may be obtained from server 120 which is associated with electronic application 126. In embodiments, the electronic list may only show those participants to another participant who has used the same electronic application 126 to electronically accept an invitation to an event via electronic application 124.

For example, Tom may use his login information from XYZ, a social networking application, to log into electronic application 124. Mary may use her login information from ABC, another social networking application (e.g., a type of electronic application 126). Bill and Jennifer may have used their login information also from XYZ. Thus, in this example, when Tom is viewing the electronic list, only Bill and Jennifer's information will be displayed to him as they all used login information from XYZ. Mary's information will not be displayed as she used a different electronic application's login information to access electronic application 124. Accordingly, the electronic list may be filtered based on electronic application 124 comparing different login information stored in database 500 as described in FIG. 5. In embodiments, the list (e.g., an electronically displayed list) may also be generated in other electronic formats associated with other electronic applications. Thus, for example the electronic list may be automatically generated in an electronic spreadsheet format that is viewable via another electronic application. In this non-limiting example, electronic application 124 may automatically generate the list in the other electronic format and may electronically send an electronic communication as an email message, text message, or other type of electronic message with the electronic list provided as an attachment or within the message. In embodiments the list in the other electronic format may be electronically communicated (simultaneously) to all the participants, via their user devices, and to the participant who generated the registration and electronic invites via electronic application 124 as described in FIG. 3.

Figure 4:
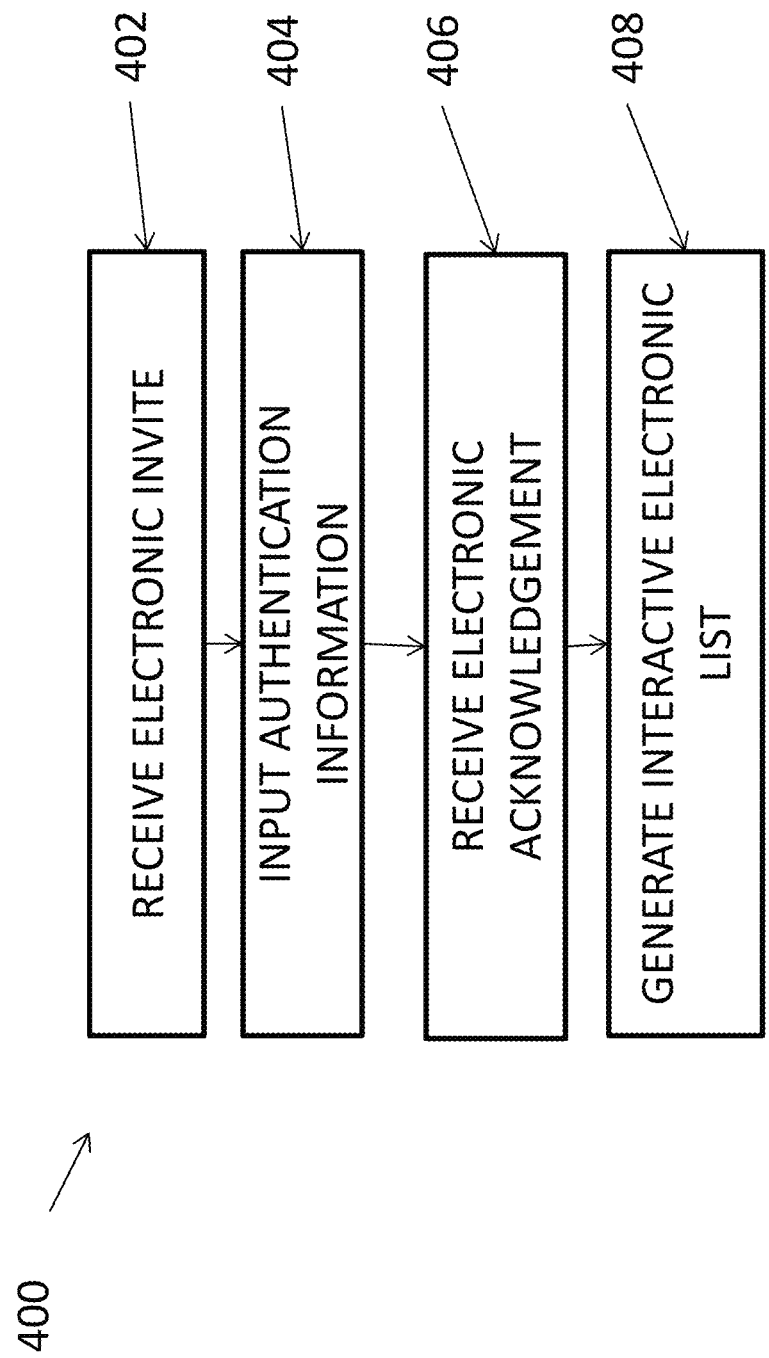
FIG. 4 is a flow chart of an example process for sending and receiving electronic communications from a user device.

FIG. 4 is a flow chart of an example process 400 for electronically logging into an electronic application to indicate participating in an event. In embodiments, example process 400 may be performed on a user device, such as user device 112, 114, or 116 as described in FIG. 1. In embodiments, example process 400 may occur automatically or may require a user of user device 112, 114, or 116 to input electronic information into user device 112, 114, or 116 via an electronic touch screen, mouse, and/or a keyboard.

At step 402, a user device (e.g., user device 112, 114, or 116) receives an electronic invite (e.g., an electronic communications message) for a request to a user to electronically input information into electronic application 124 so as to allow the user to participate in an event (e.g., electronic event or a real-world event). In embodiments, the electronic invite may be received by the user device based on the user of the user device selecting a website or an electronic page associated with the event. In alternate embodiments, the request may be received by the user device based on the user selecting an electronic communications link (e.g., hyperlink) within a text message, email, simple messaging service (SMS) message, multimedia messaging service (MMS) message, and/or any other electronic communications platform.

At step 404, authentication information may be inputted into electronic application 124. In embodiments, the authentication information may be inputted by a user of user device 112, 114, or 116 by using a touchscreen, keyboard, mouse, or any other device. In embodiments, the authentication information may include a login identifier and password associated with one or more electronic applications, such as electronic application 126. In embodiments, the authentication information may be entered electronically by the user or the authentication information may automatically be entered (e.g., using an autocomplete operation) based on previous login attempts by the user.

At step 406, an electronic acknowledgement message may be received by the user device. In embodiments, the electronic acknowledgement message is generated based on a server, such as server 120, another computing device, and/or electronic application 126 analyzing authentication information electronically entered into electronic application 124. In embodiments, electronic application 124 may send the authentication information, associated with electronic application 126, to electronic application 126 and/or server 120. In alternate embodiments, computing device 122 or application server 118 may obtain the authentication information from electronic application 124 and then send the authentication information to server 120 and/or electronic application 126. In embodiments, electronic application 124 may also receive more than one electronic account (e.g., one or more electronic pages whose content is controlled by a user and that has login credentials) associated with electronic application 126. For example, a user may have an electronic business profile page (e.g., Bill's Bakery) and an electronic personal profile page (e.g., Bill) associated with that particular electronic application 126. Accordingly, the user may choose one or more of the electronic profile pages/accounts associated with the login authentication information for electronic application 126.

At step 408, an electronic list may be electronically displayed on the user device. In embodiments, the electronic list may be displayed before, during, or after the event's time period. In embodiments, the electronic list may display all the participants of the event or may be filtered with only some of the participants. In embodiments, the filtering of the electronic list may be based on user-inputted information into electronic application 124. In alternate embodiments, the filtering of the electronic list may be based on stored rules in electronic application 124 that automatically determine to who the electronic list should be displayed. For example, the electronic list may only display those participants who are associated with the same electronic application 126. In embodiments, the electronic list may only be electronically displayed (e.g., accessible) to the event participants for a limited period of time. For example, the electronic list may only be electronically displayed in electronic application 124 for two weeks after the conclusion of the event. In alternate embodiments, the electronic list may be electronically displayed in electronic application 124 based on the user preference (e.g., one day, one week, no time period limit, etc.).

In embodiments, the electronic list may include an event participant's name, or pseudonym, and/or an icon or graphical image associated with one or more electronic applications 126. In embodiments, the user may select the name, the icon, or graphical image (e.g., touching the screen, using a mouse, using a particular keystroke(s) on a keyboard, etc.) and which may result in an electronic page from electronic application 126 being displayed on the user device. In embodiments, the user may automatically interact with the other participant's information (e.g., profile page) within electronic application 126 without requiring the user to log into electronic application 126 via an electronic page stored by and/or within electronic application 126. In embodiments, the user may interact by electronically communicating with the other participant within the other participant's profile page in electronic application 126. In alternate embodiments, selecting the name, icon, or graphical image in electronic application 126 may automatically create an electronic communications link between the user's electronic account in electronic application 126 and the other participant's electronic account in electronic application 126; and, thus, allowing future electronic communications to occur between each user's electronic accounts within electronic application 126.

For example, the user and the other participants (e.g., other users using electronic application 124) associated with the event may electronically communicate with each other by sending text, photos, images, and/or videos. Furthermore, the user and the other participants of the event may send/receive electronic messages that indicate that they participated in the same event. Also, for example, the user and the other participant may electronically communicate with each other by voting, following, or liking, each other within electronic application 126 that results in a change in an electronic value associated with a number of followers, likes, votes, and/or any other electronic feature within electronic application 126. In embodiments, if the user decides to electronically communicate with another participant within electronic application 126, the electronic list may show an icon or graphical image that indicates that one or more event participants have interacted with each other.

In embodiments, if a user decides to like, follow, or vote for another username that is listed on the electronic page, there may be different electronic buttons or icons that allow the user to electronically make these particular selections. In embodiments, there may be an electronic select all button displayed on the electronic list, within electronic application 124, that allows a user to select all usernames listed on the electronic list. In embodiments, the user can then deselect some, or even all, of the usernames. In alternate embodiments, the user can instead select multiple names by electronically highlighting the usernames or checking an electronic box next to each usernames. In embodiments, electronic application 124 may indicate an electronic message if the user selects users who did not use authentication credentials associated with the same electronic application as the user. For example, the electronic message may include a warning/error and an electronic link that would allow the user to electronically connect to electronic application 126 to allow for setting up an electronic profile page(s) and/or electronic account with that particular electronic application 126.

In embodiments, the user may then select an electronic "like" or "vote" button or an electronic "follow" button that allows the user to like and/or follow those usernames on the list that have been selected by the user. In embodiments, by selecting the "like" button, one or more electronic messages may be sent to each electronic account associated with that username and will result in an electronic change to an electronic page associated with that username within electronic application 126. In embodiments, by selecting the "follow" button, one or more electronic messages generated by the other users, using electronic application 126, may be automatically sent to the user's electronic profile page(s) that are stored by the same electronic application 126.

In embodiments, there may be an electronic "message" button that allows the user to send an electronic message, generated within electronic application 124, to electronic application 126 for only those usernames on the electronic list. In embodiments, the electronic message may include text, emojis, graphics, photos, videos, etc., that can be electronically displayed within the other user's electronic profile page(s) that are stored by electronic application 126. Accordingly, electronic information about the event itself can be electronically communicated to a larger number of individuals using less computing resources and memory to electronically search for those users since the information about the event can be electronically displayed to additional users (e.g., friends, colleagues, etc.) who use electronic application 126 but did not participate in the event.

FIG. 5 describes an example data structure 500 that stores authentication information associated with electronic application 126. In embodiments, data structure 500 may include a collection of fields such as ID/Password 502, Customer Pseudonym 504, Icon Display 506, and ID of Other Users 508. Although FIG. 5 shows example fields 502-508, in other embodiments, data structure 500 may include fewer fields, different fields, additional fields, and/or differently arranged fields than depicted in FIG. 5. In embodiments, application server 118 may store some or all of data structure 500. Additionally, or alternatively, computing device 122 may store some or all of data structure 500.

In embodiments, ID/Password 502 may store a username and/or password associated with electronic application 126. ID/Password 502 may include one or more alphanumeric symbols (e.g., letters, numbers) and/or other types of symbols. In embodiments, Customer Pseudonym 504 may include the identifier that is different than a person's legal name and is used to identify a participant on an electronic list as described in FIGS. 3 and 4. In embodiments, Icon Display Code 506 may include a code that is associated with a particular electronic application 126 and is also used to generate an image associated with each type of electronic application 126 used by each participant who uses electronic application 124 to participant in an event. ID of Other Users 508 may indicate those users, electronically signed into electronic application 124 and associated with a particular event, who have electronically interacted with the user via the electronic list as described in FIGS. 3 and 4.

FIGS. 6-16 are diagrams of example processes for using an electronic application for generating an electronic communications and to send an electronic invite associated with an event, providing authentication login information associated with another electronic application, participating in an event, generating an electronic list, and electronically interacting with different electronic profiles listed on the electronic list. In embodiments, the example process described in the following figures may use one or more of the devices, networks, and electronic applications described in FIGS. 1 and 2. Furthermore, in embodiments, the example processes described in the following figures may have one or more features described in the flowcharts and/or data structure described in FIGS. 3-5.

Figure 6:
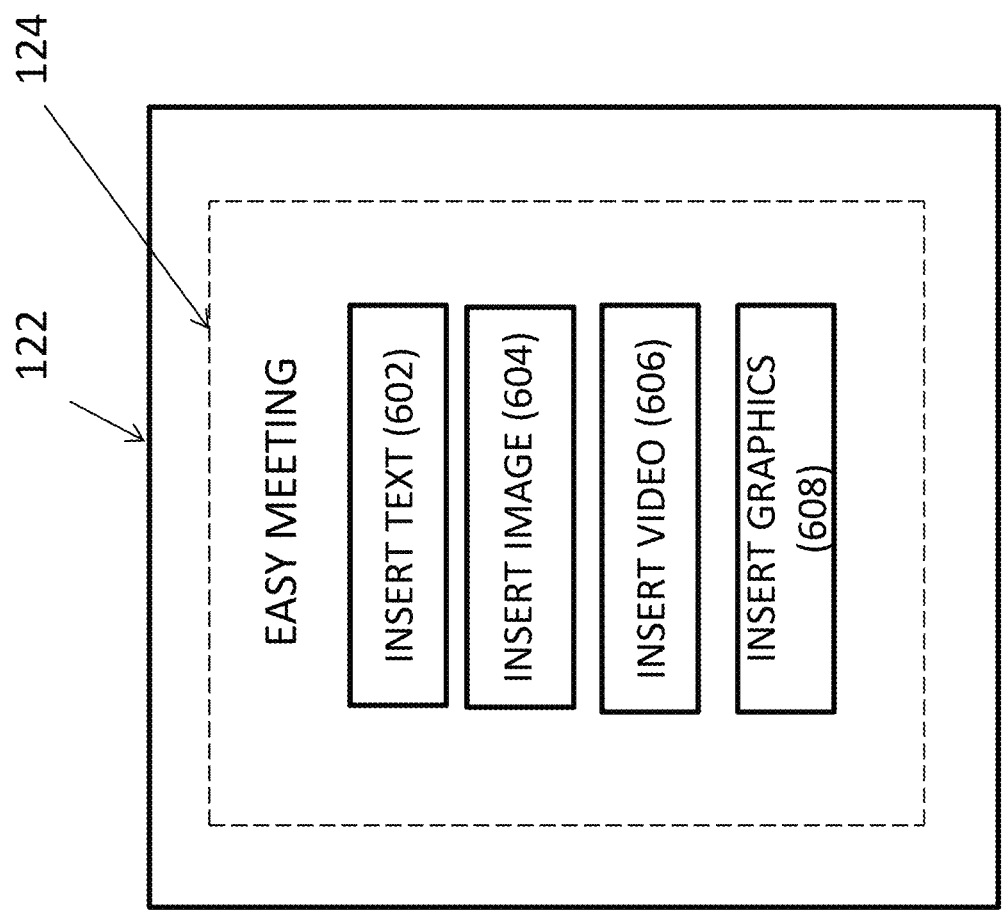
FIGS. 6-16 are example diagrams for sharing electronic communications.

FIG. 6 shows a computing device 122 and electronic application 124 as described in FIG. 1. In embodiments, a user of the computing device may decide to generate an electronic page associated with an event. In FIG. 6, for example, John has decided to have a cocktail party at his art gallery business and decides to use electronic application 124 (as described in FIG. 1) to create an electronic invite to people that he would like to participate in the cocktail party. As shown in FIG. 6, electronic application 124 may provide various electronic options to John. This includes Insert Text 602 (e.g., to insert to text), Insert Image 604 (e.g., to insert photos, images, etc.), Insert Video 606 (e.g., to insert video), Insert Graphics 608 (e.g., to insert graphics). In embodiments, the selections may be electronic links to other electronic pages within electronic application 124, or other electronic applications, that allow John to create how an electronic invite will be electronically displayed on a user device (e.g., user device 112). In alternate embodiments, not shown, electronic application 124 may include additional of fewer features that are different than described in FIG. 6.

Figure 7:
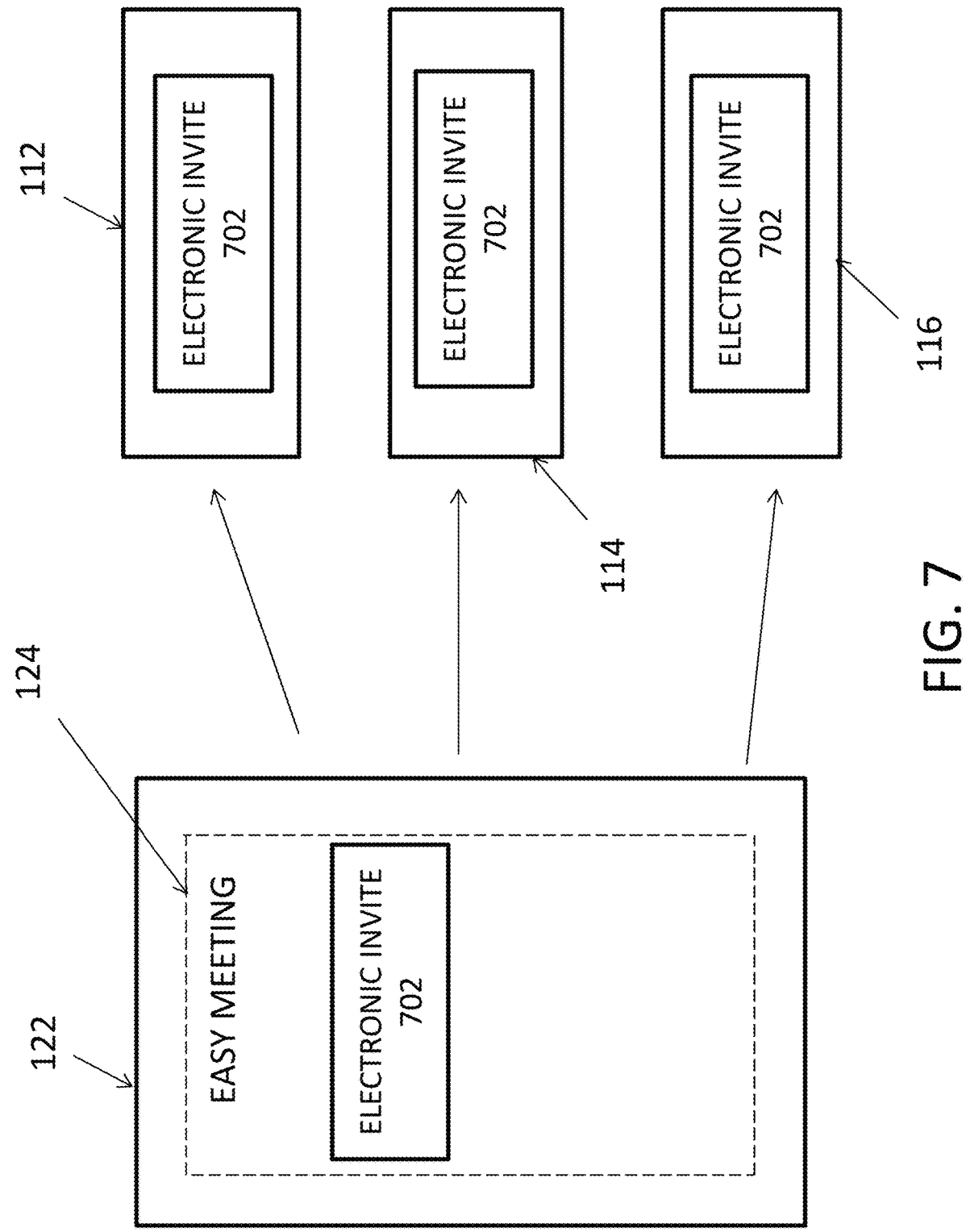

Upon creating an electronic invite, John may decide to send the electronic invite, electronic invite 702, to those individuals that he would like to attend the cocktail party. As shown in FIG. 7, John sends electronic invite 702 to Linda (who is using user device 112), Miriam (who is using user device 114), and Kapoor (who is using user device 116).

Figure 8:
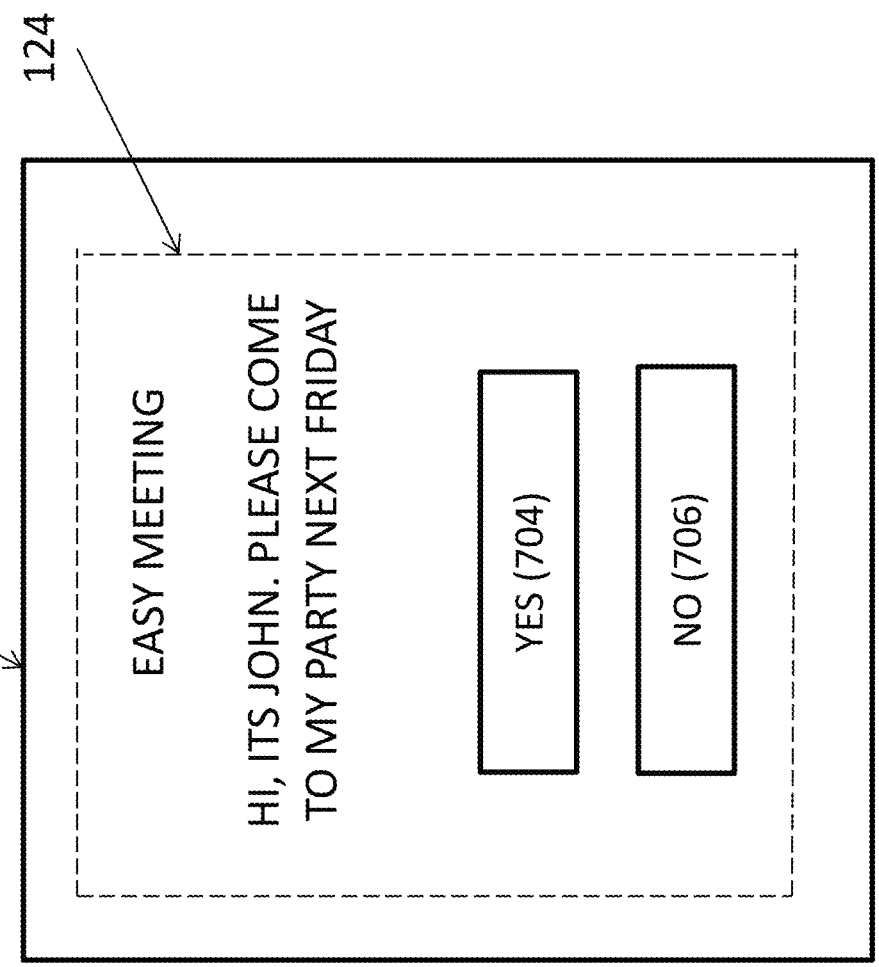

Linda, Miriam, and Kapoor decide to open electronic invite 702. When Linda, Miriam, and Kapoor electronically open electronic invite 702, their user devices electronically display an electronic invite page stored by electronic application 124. As shown in FIG. 8, the electronic invite from John provides information about the event ("Please come to my party next Friday!"). Electronic invite 702 also includes selection 704 (YES) which allows Linda, Miriam, and Kapoor to provide login information associated with another electronic application, such as electronic application 126 to electronically communicate with John that they will, or will not, be attending the cocktail party. Selection 704 also allows Linda, Miriam, and Kapoor to login as a guest and without providing any information associated with another electronic application. Selection 706 (NO) may be selected by a user if they do not wish to participate in the event. In alternate embodiments, electronic invite 702 may not provide any selection 704 or 706 and would only request login information which a user may choose to provide.

Figure 9:
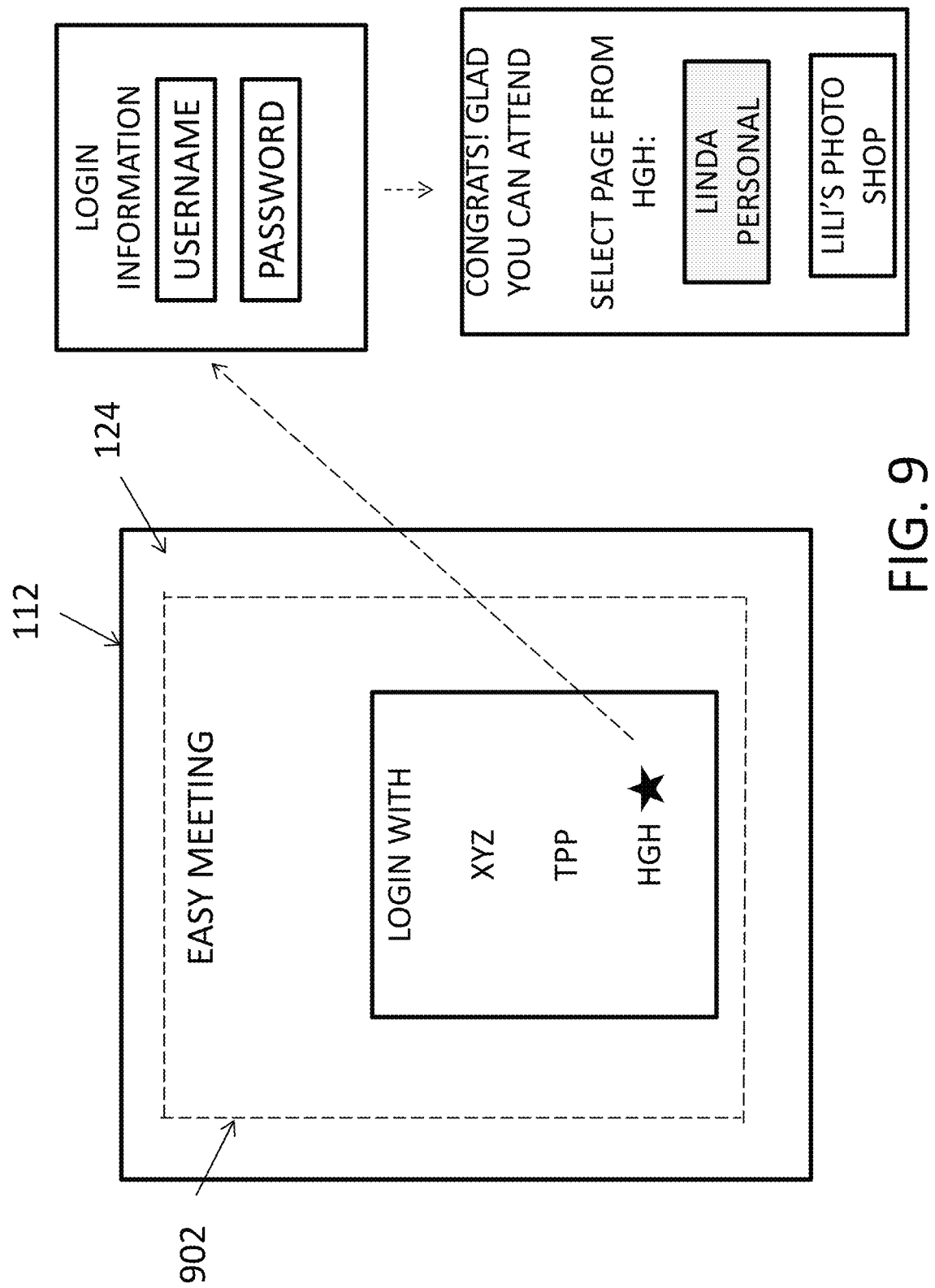

Linda decides to electronically select selection 704. Upon selecting selection 704, as shown in FIG. 9, electronic screen 902 (either as a pop-up screen, or as another screen) appears on user device 112. Electronic screen 902 provides Linda with the option to electronically communicate and indicate her participation by using login information associated with either XYZ, TPP, or HGH applications. Linda does not have any electronic pages, electronic profile, or login information associated with XYZ or TPP, but does have an electronic page and login information associated with the HGH application. In embodiments, HGH application may be type of electronic application 126 as described in FIG. 1. Linda selects the HGH application selection and, as further shown in FIG. 9, electronic application 124 requests Linda's login information associated with HGH application. Linda then enters her username and password associated with the HGH application. In embodiments, electronic application 124 then electronically authenticates Linda's username and password by electronically communicating with the HGH application which is stored on a server, such as described in FIG. 1. Upon successful electronic authentication of the username and password, electronic application 124 displays a success message (e.g., "Congrats! Glad you can attend."). As further shown in FIG. 9, electronic application 124 then asks Linda to select from one of her electronic profile pages/accounts within HGH. As shown, Linda decides to select her personal page. While not shown, if the username and password are not successfully authenticated, electronic application 124 displays an error message of some kind and requests the user, Linda, to reenter the username and password information again; or, to use another type of electronic application 126 to login and electronically communicate with John that Linda will be participating in the cocktail party.

Figure 10:
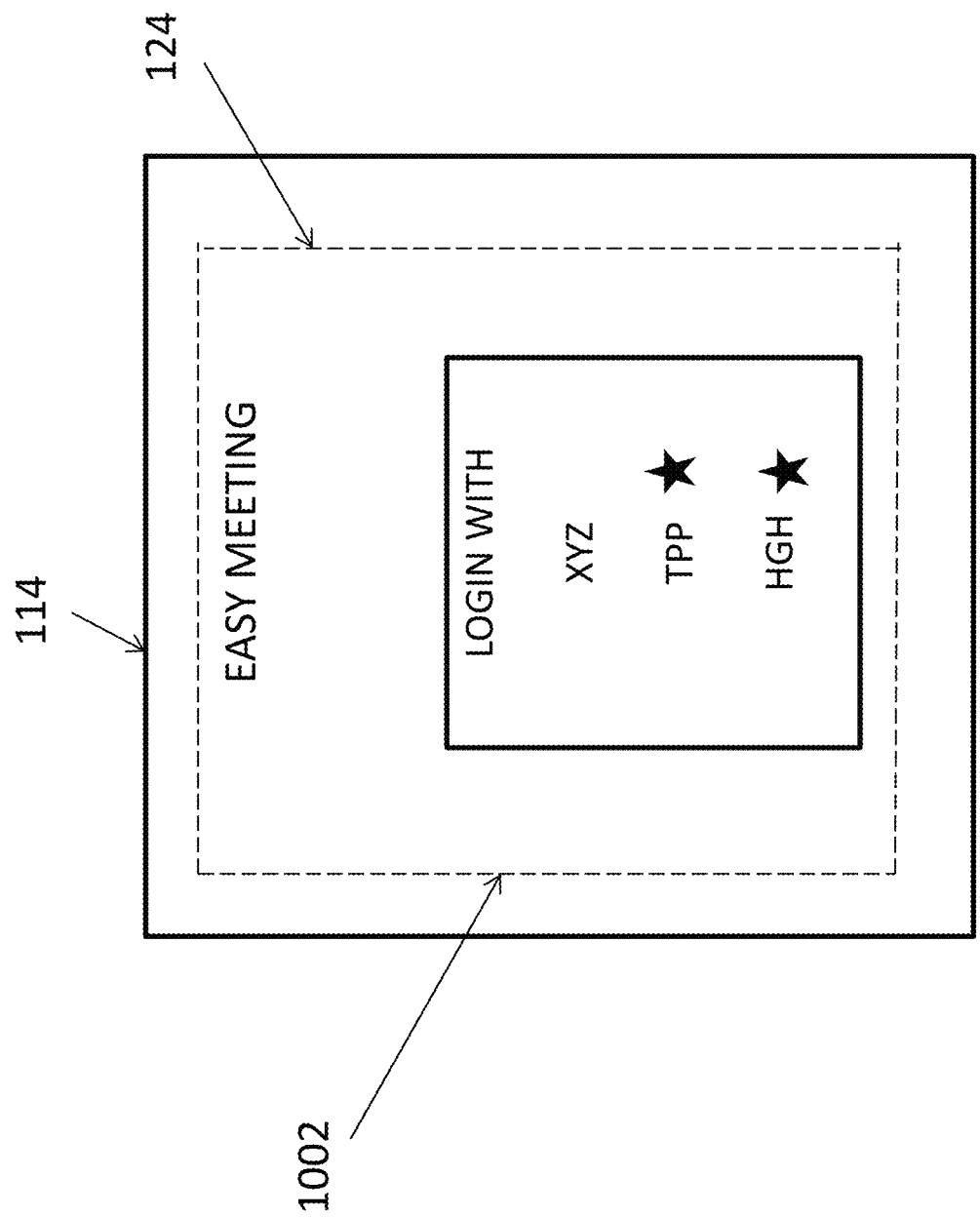

Miriam also decides to electronically select selection 704. Upon selecting selection 704, as shown in FIG. 10, electronic screen 1002 (either as a pop-up screen, or as another screen) appears on user device 114. Electronic screen 1002 provides Miriam with the option to electronically communicate and indicate her participation by using login information associated with either XYZ, TPP, or HGH applications. Miriam does not have any electronic pages, electronic profile, or login information associated with XYZ, but does have an electronic page and login information associated with the TPP and the HGH application. However, Miriam only selects the HGH application selection and, thus, electronic application 124 requests Miriam's login information associated with HGH application. Miriam then enters her username and password associated with the HGH application. In embodiments, electronic application 124 then electronically authenticates Miriam's username and password by electronically communicating with the HGH application which is stored on a server, such as described in FIG. 1. Upon success electronic authentication of the username and password, electronic application 124 displays a successful message. If the username and password are not successfully authenticated, electronic application 124 displays an error message of some kind and requests the user, Miriam, to reenter the username and password information again or to use another type of electronic application 126 to login and electronically communicate with John that Miriam will be participating in the cocktail party.

Figure 11:
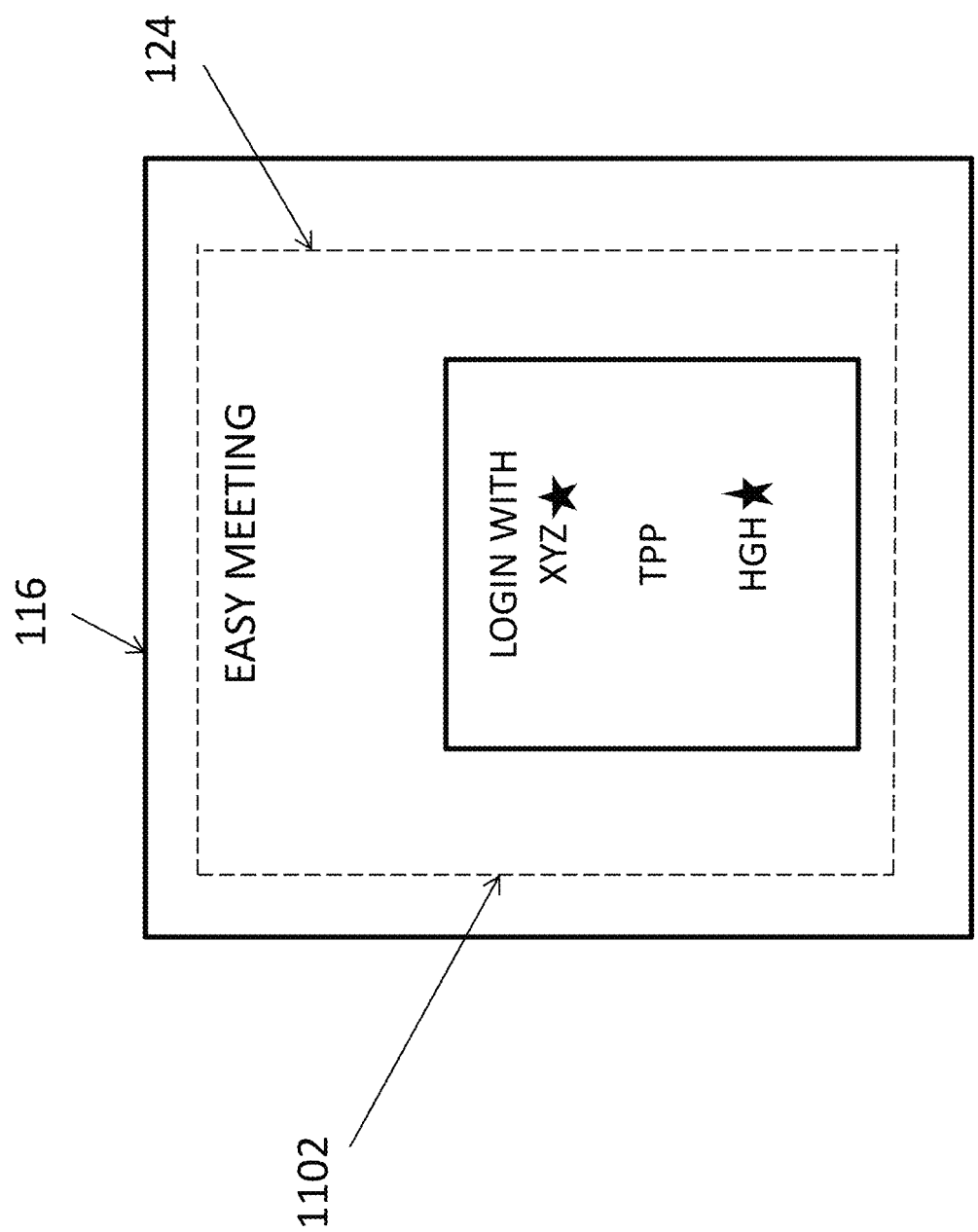

Kapoor also decides to electronically select selection 704. Upon selecting selection 704, as shown in FIG. 11, electronic screen 1102 (either as a pop-up screen, or as another screen) appears on user device 116. Electronic screen 1102 provides Miriam with the option to electronically communicate and indicate her participation by using login information associated with either XYZ, TPP, or HGH applications. Kapoor does not have any electronic pages, electronic profile, or login information associated with TPP, but does have an electronic page and login information associated with the HGH and the XYZ application. In embodiments, HGH and the XYZ applications may types of be electronic application 126 as described in FIG. 1. Kapoor is given the option to select both the XYZ and the HGH applications. Kapoor decides to select to provide login information associated with both the XYZ and the HGH application. Electronic application 124 then requests Kapoor's login information associated with the XYZ and the HGH applications. Kapoor then enters his username and password associated with the XYZ and the HGH application.

Figure 12:
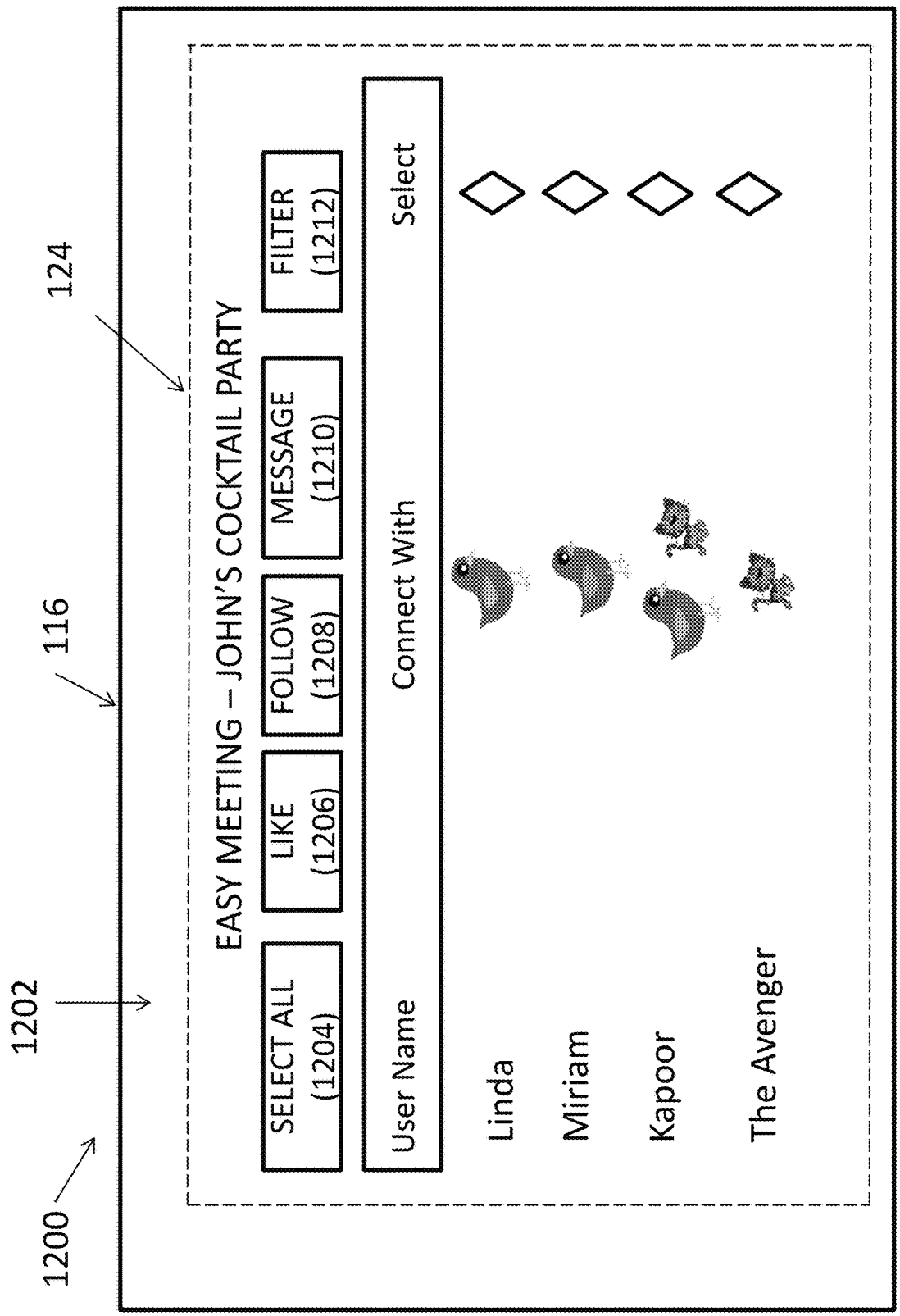

Once Linda, Miriam, and Kapoor have provided their login information, and the login information is authenticated, electronic application 124 stores the information (e.g., such as in data structure 500 described in FIG. 5) and electronically generates electronic list 1202, within electronic screen 1200, as shown in FIG. 12 which can only be viewed by John and the other participants whose usernames are listed on electronic list 1202. Electronic list 1202 shows the list of individuals who have electronically communicated with John that they are attending the cocktail party. As shown in electronic list 1202, Linda, Miriam, and Kapoor are shown. Also, as shown in electronic list 1202, the Avenger has used login information associated with the XYZ application. The Avenger is a pseudonym of an individual who electronically selected the option of using a pseudonym instead of that individual's actual name.

Electronic list 1202 also shows icons associated with each electronic application that was used by each person on electronic list 1202 log into electronic application 124 using authentication information associated with another electronic application to electronically communicate with John that they are attending the cocktail party. For example, next to Linda's name is an icon (a bird) associated with the HGH application and next to Miriam's name is the same icon associated with the HGH application. Next to Kapoor's name is the icon associated with the HGH application and also another icon (a cat) associated with the XYZ application. Electronic list 1202, upon being selected by any individual on electronic 1202 within electronic application 124, is electronically displayed on user devices to Linda, Miriam, Kapoor, and the Avenger.

FIG. 12 also shows Select All 1204, Like 1206, Follow 1208, Message 1210, and Filter 1212. A user may, for example, choose Select All 1204 that electronically selects all the names on electronic list 1202. Additionally, or alternatively, a user may, for example, choose Like 1206. By choosing Like All 1206, a user of electronic application 124 can initiate an electronic communication between electronic application 124 and electronic applications 126 that are associated with each selected name on electronic list 1202. This particular electronic communication results in a change in an electronic profile page in electronic application 126. For example, Linda may select Miriam's name and then select Like 1206. As such, on Linda's electronic profile page on the HGH application indicates an increase in the number of likes and also indicates that the like was initiated by Linda. Furthermore, the electronic communication may result in an electronic message appearing on Miriam's electronic profile page that she met with Linda (e.g., "Miriam was at John's Cocktail Party and met Linda").

Linda may also decide to choose Select All 1204 and select all the names on electronic list 1202. Linda may have a choice to deselect some of the names of electronic list 1202 (e.g., clicking on an electronic check box, un-highlighting a name, etc.). Regardless, Linda can then also choose to electronically select Like 1206, as discussed above, or select Follow 1208. By selecting Follow 1208, Linda can follow one or more of the individuals on electronic list 1202. Specifically, Linda's electronic profile page(s) on the HGH application that is also used by other users of the list will receive electronic communication messages associated with any electronic inputs made on the other user's electronic profile page(s) associated with that same electronic application 126.

Linda can also decide to choose Message 1210 which allows for Linda to create a message in electronic application 124 and which is then sent to electronic application 126 of those individuals who have been electronically selected by Linda on electronic list 1202. In embodiments, electronic application 124 may provide for an electronic pop-up text box to appear that allows Linda to electronically send text, photos, videos, and/or graphics to selected users on the HGH application who used their HGH application login credentials to participate in the event.

Accordingly, the electronic features of electronic list 1202 allows a user to send and receive a greater number of electronic communications since the user is able to obtain electronic information about other users on other electronic applications (e.g., electronic application 126) by using less electronic/computing resources and electronic communications to find those individuals associated with electronic applications which are already being used by the user. Furthermore, the user is able to increase electronic communications with individuals who were electronically discovered.

Figure 13:
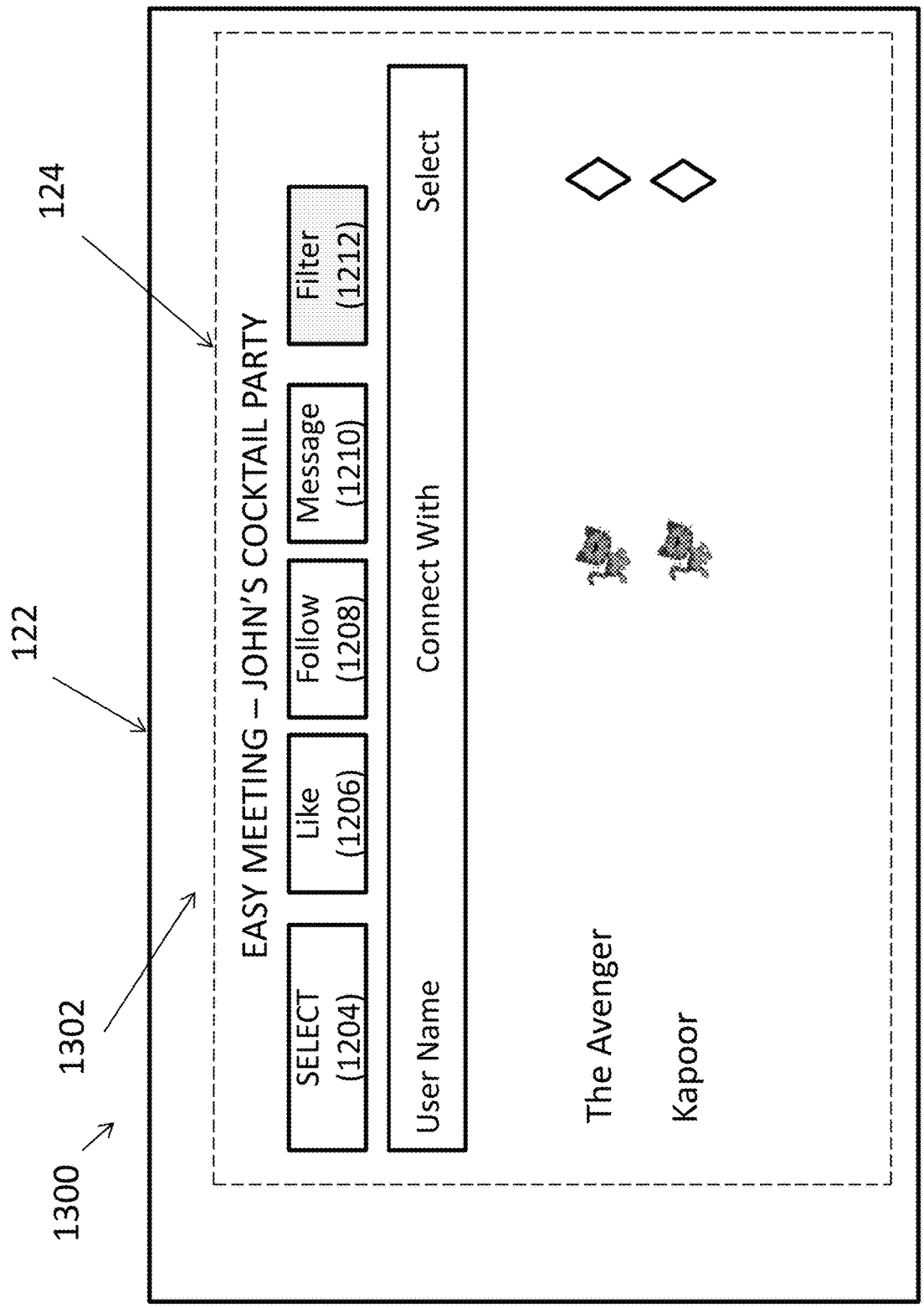

A filtering feature may be used to only show participants on an electronic list who have used the same electronic application 126 to log into electronic application 124. As discussed in FIGS. 3 and 4, the filtering feature may automatically filter an electronic list or may be filtered by electronic user inputs into electronic application 124. Kapoor decides that he only wants to see those participants who are associated with the XYZ application. As shown in FIG. 13, based on the filtering feature, electronic list 1203, which is a filtered version of electronic list 1202, now only shows Kapoor's name and the Avenger pseudonym.

Figure 14:
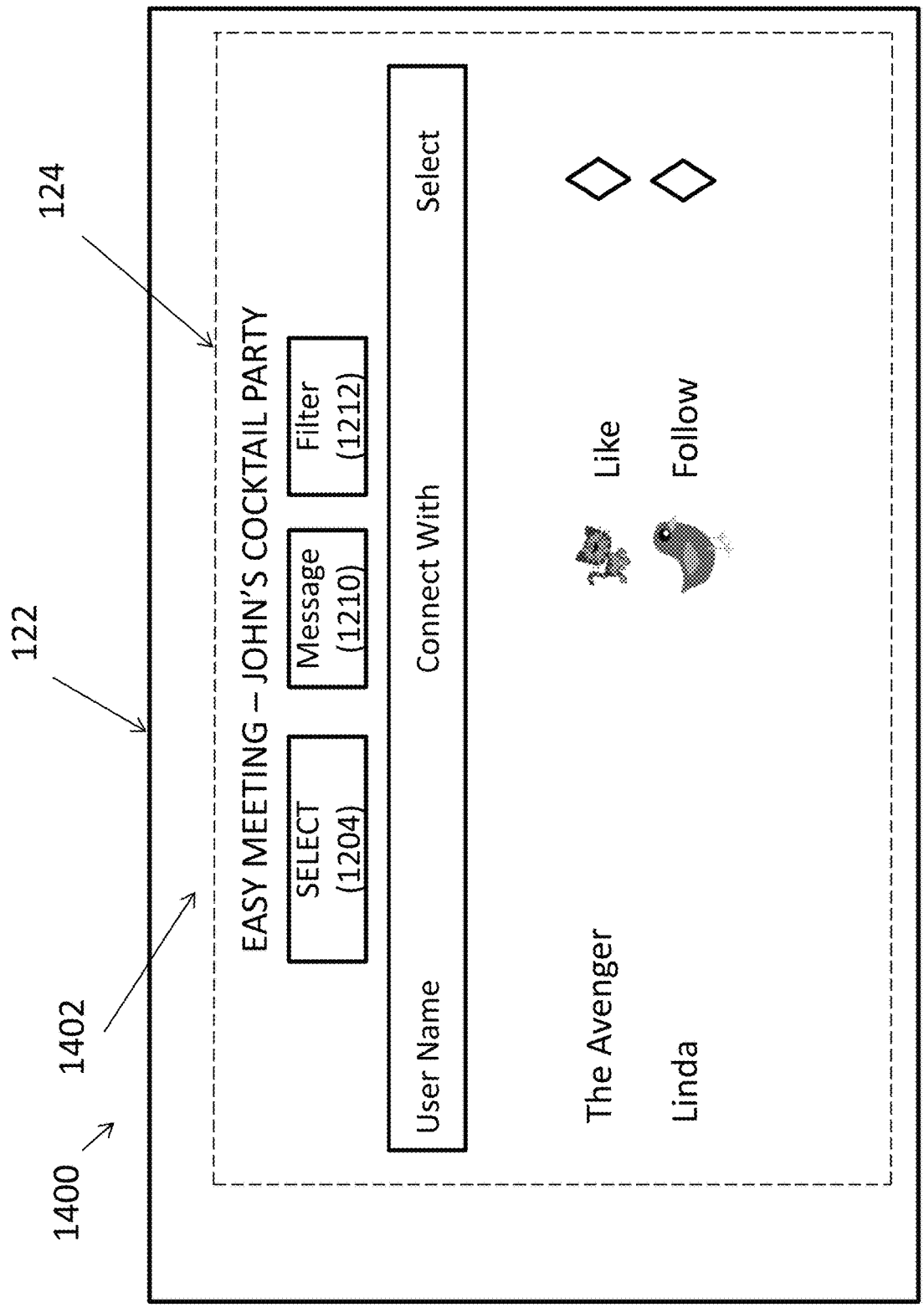

FIG. 14 shows another example screen shoot, 1400, of an electronic list, electronic list 1402. In this example, the like and follow features are electronically incorporated with the electronic graphical icon. Thus, when electronically selecting the cat icon next to Kapoor's name, a user would automatically send an electronic communications message to Kapoor's electronic profile page at the XYZ application and/or update a value associated with a feature within the XYZ application (e.g., number of likes, follows, votes, electronic tokens, etc.).

Figure 15:
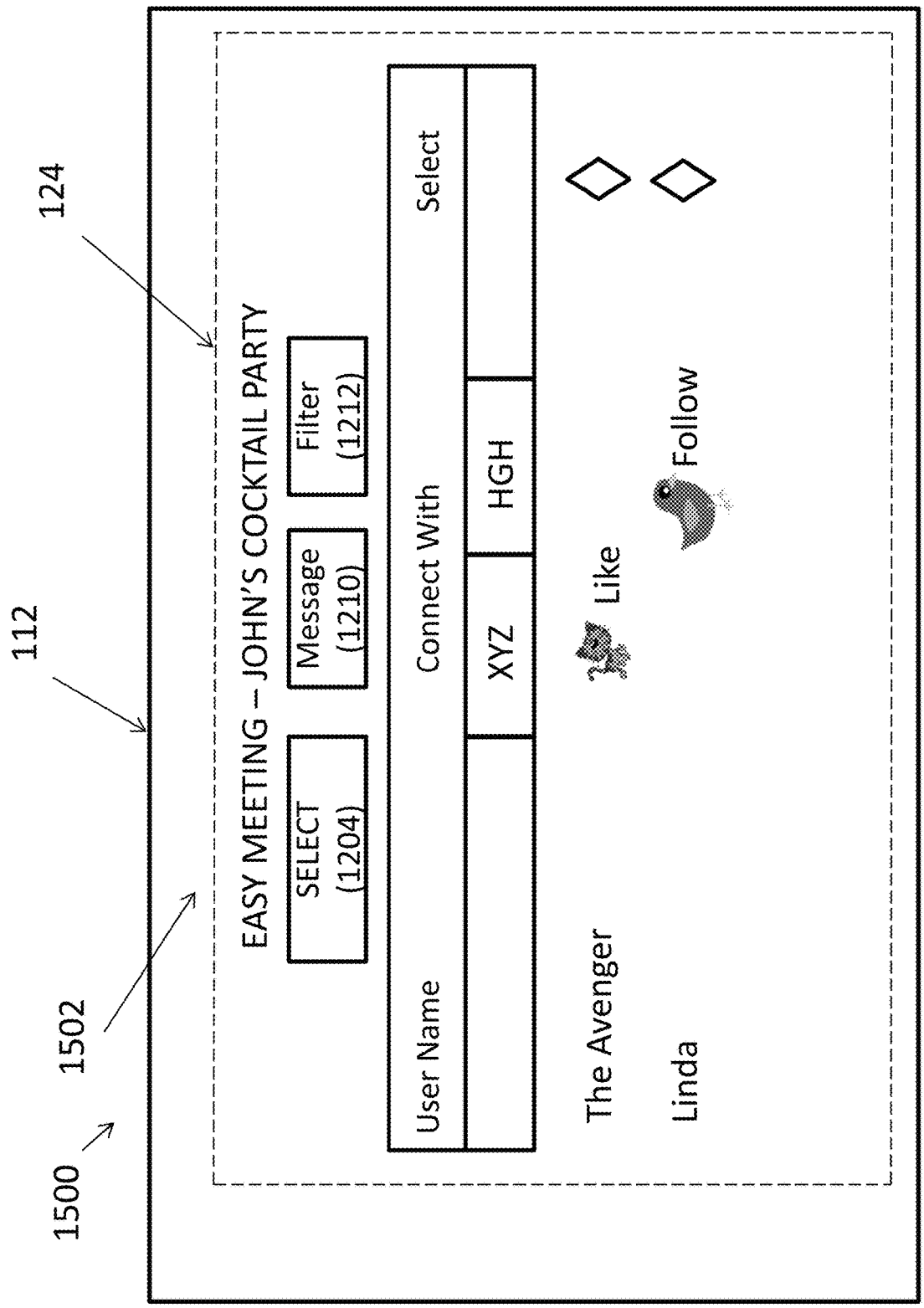

FIG. 15 shows another example screen shot, 1500, of an electronic list, electronic list 1502. In this example, different electronic applications (e.g., electronic applications 126) are listed in electronically generated columns (e.g., one column for XYZ application and another for HGH application).

Figure 16:
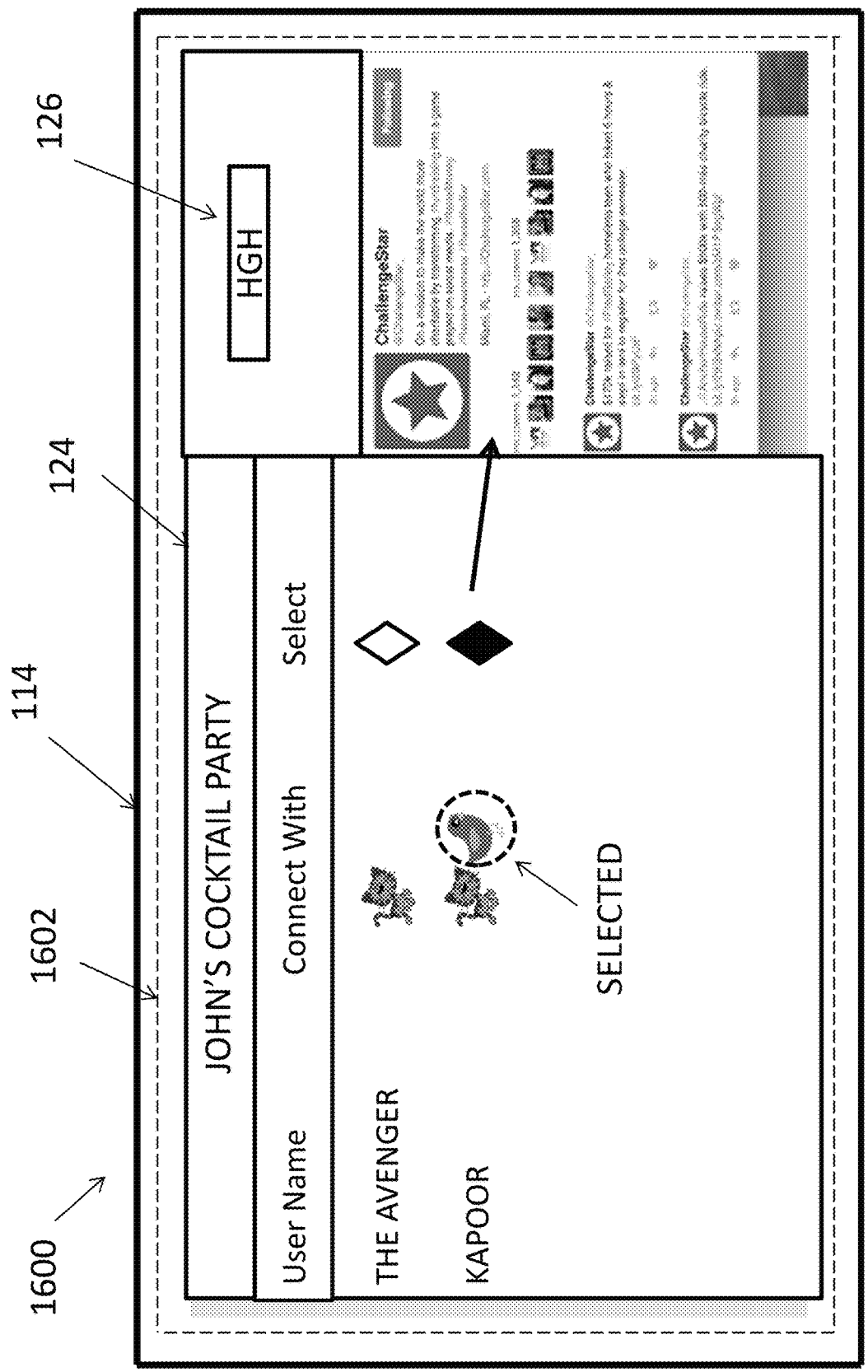

FIG. 16 shows another example screen shoot, 1600, of what happens when one of the usernames on an electronic list, electronic list 1602, is selected. As shown in FIG. 16, Miriam is viewing electronic list 1602. It is assumed for this example that Miriam's own name is not shown on electronic list 1602 and that Linda has decided to no longer participate in John's cocktail party. As shown in FIG. 16, Miriam selects Kapoor's identifier/icon associated with the HGH application. As further shown in FIG. 16, the HGH application (e.g., a type of electronic application 126) appears in an electronic screen (in this example, as an electronic pop-up screen). Thus, in embodiments, electronic application 126 may, when selected by a user within electronic application 126 who has login credentials to electronic application 126, view electronic information displayed on an electronic page within and/or stored by electronic application 126.

While FIGS. 12-15 show that the user viewing an electronic list is also able to see their own name/username/pseudonym on the electronic list, alternate embodiments may not show the user's name on the list while that particular user is viewing the list within electronic application 124. Also while FIGS. 12-16 show particular types of icons (a cat and a bird), other types of graphics and icons may be displayed.

Figure 17:
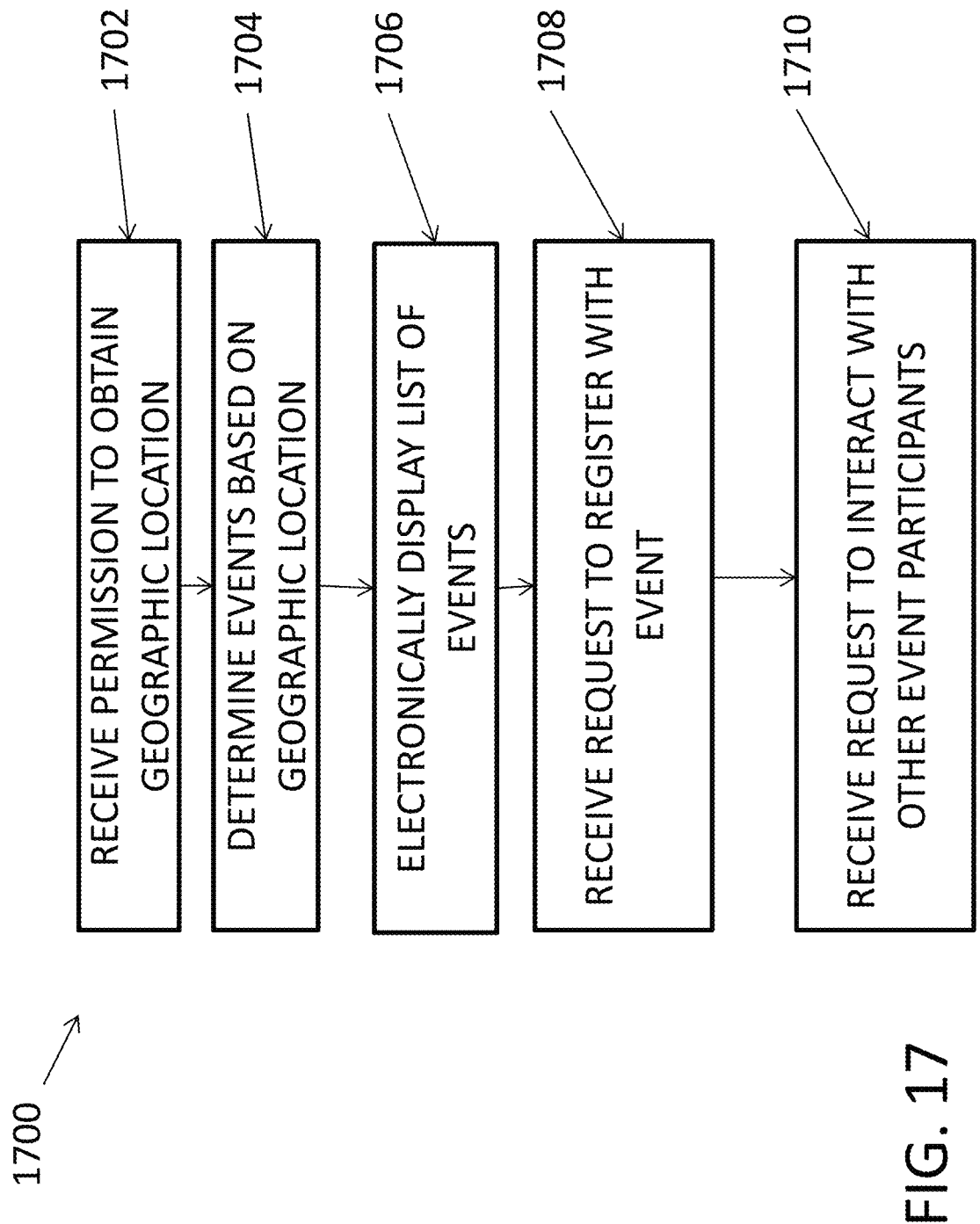
FIG. 17 is a flow chart of an example process for sending and receiving electronic communications from a user device.

FIG. 17 is a flow chart of an example process 1700 for electronically searching for an event and participating in the event. In embodiments, example process 1700 may be performed by electronic application 124 on a user device, such as user device 112, 114, or 116 as described in FIG. 1. In embodiments, example process 1700 may occur automatically or may require a user of user device 112, 114, or 116 to input electronic information into user device 112, 114, or 116 via an electronic touch screen, mouse, and/or a keyboard.

At step 1702, a user of a user device may electronically provide an electronic communication that is received by electronic application 124 that permits electronic application 124 to determine geographic location of the user via the location of the user device. In embodiments, the user may have selected electronic application 124 which may have a welcome screen that includes an option to electronically find events within a geographic region. In embodiments, the user may also provide information to electronic application 124 to find events within a particular radius (e.g., within 10 miles of the user's location). In embodiments, the user may log into electronic application 124 prior to providing permission to electronic application 124 to determine and use the user's geographic location; or, the user may not log or electronically register with electronic application 124 to provide permission to electronic application 124 to determine and use the user's geographic location.

At step 1704, electronic application 124 may determine events based on (1) the geographic relationship between the user and the event, (2) the time of the event, and/or (3) the travel distance between the user and the event. In embodiments, electronically application 124 may automatically find events without the user having to perform any additional electronic communications other than requesting electronic application 124 to find events. In embodiments, electronic application 124 may receive instructions on electronically searching for events (registered with electronic application 124) based on information provided by the user, such as geographic location, type of event, cost of event, and/or other information. In embodiments, electronic application 124 may determine the user's geographic location by determining the user device's geographic location based on GPS, RTK GPS, Bluetooth, wifi, radio waves, and/or any other type of location seeking technology.

For example, electronic application 124 may determine that the time is 10:00 a.m. and a user is in Coral Springs, Fla. (based on permission from the user, via electronic application 124, to obtain geographic location information). Electronic application 124 may determine, based on stored information about registered events, that there is an event in Miami Beach, Fla. that starts at 10:30 a.m. Electronic application 124 may determine that while the user is within a particular geographic area (in this example, a metropolitan area—the West Palm Beach-Fort Lauderdale-Miami metropolitan area), electronic application 124 may determine that the user does not sufficient travel time to reach the event. Thus, electronic application 124 may determine not to electronically display such an event or electronic application 124 may display the event but provide information that the user will not reach the event on time.

In embodiments, electronic application 124 may also electronically communicate with the user device's electronic calendar to determine whether other events exist at particular times so as to not display events that will conflict with prior committed engagements by the user. In embodiments, electronic application 124 may not electronically display events that are within a particular time period (e.g., within 10 minutes, 30 minutes, one hour) of another event obtained from the electronic calendar and/or a travel distance between the user and the event because the user may not be able to arrive at the event start time. For example, a user may have a doctor's appointment on May 2 at 2:00 p.m. During a search of events, based on the user's geographic location, electronic application 124 may find an event at 2:30 p.m. on the same day. However, electronic application 124 may not electronically display the event at 2:30 p.m. because the user has the doctor's appointment at or around the same time and the travel distance is one hour. If the travel distance was 15 minutes, then electronic application 124 may display the event (via the user device).

At step 1706, electronic application 124 may display a list of events on the user device. In embodiments, electronic application 124 may automatically and simultaneously display the list of events on the user device. In embodiments, the list may be displayed textually or as locations on an electronic map that is displayed on the user device.

At step 1708, electronic application 124 may receive an electronic communication that includes a request to electronically register with the event in a manner similar to that described in step 404 in FIG. 4 and/or in FIG. 9; or, a request to provide login information associated with electronic application 126. In embodiments, upon registration or providing login information, electronic application 124 may electronically display additional information about a particular event which includes a list of users that the user can electronically interact with in a manner similar to that described in step 408 in FIG. 4 and/or in FIGS. 12-16.

Thus, electronic application 124 may display a list of other participants of the event and the user may electronically interact with the other users as described in FIG. 4, by selecting an icon, name, or graphical image that is associated with another electronic application associated with the other participants. In embodiments, the user may electronically store the list for future reference. Thus, the list for a particular event may not electronically expire so the user may not have to spend additional electronic resources to electronically find other participants in the event once the event has expired. In embodiments, the list (e.g., an electronically displayed list) may also be generated in other electronic formats associated with other electronic applications. Thus, for example the electronic list may be automatically generated in an electronic spreadsheet format that is viewable via another electronic application. In this non-limiting example, electronic application 124 may automatically generate the list in the other electronic format and may electronically send an electronic communication as an email message, text message, or other type of electronic message with the electronic list provided as an attachment or within the message. In embodiments the list in the other electronic format may be electronically communicated (simultaneously) to all the participants, via their user devices, and to the participant who generated the registration and electronic invites via electronic application 124 as described in FIG. 3.

At step 1710, electronic application 124 may receive a request from the user device that the user requests electronic communications with other participants. In embodiments, electronic application 124 may permit the electronic communication to occur or electronic application 124 may request the user provide login information associated with electronic application 126 in a similar manner as described in step 408 in FIG. 4.

Figure 18:
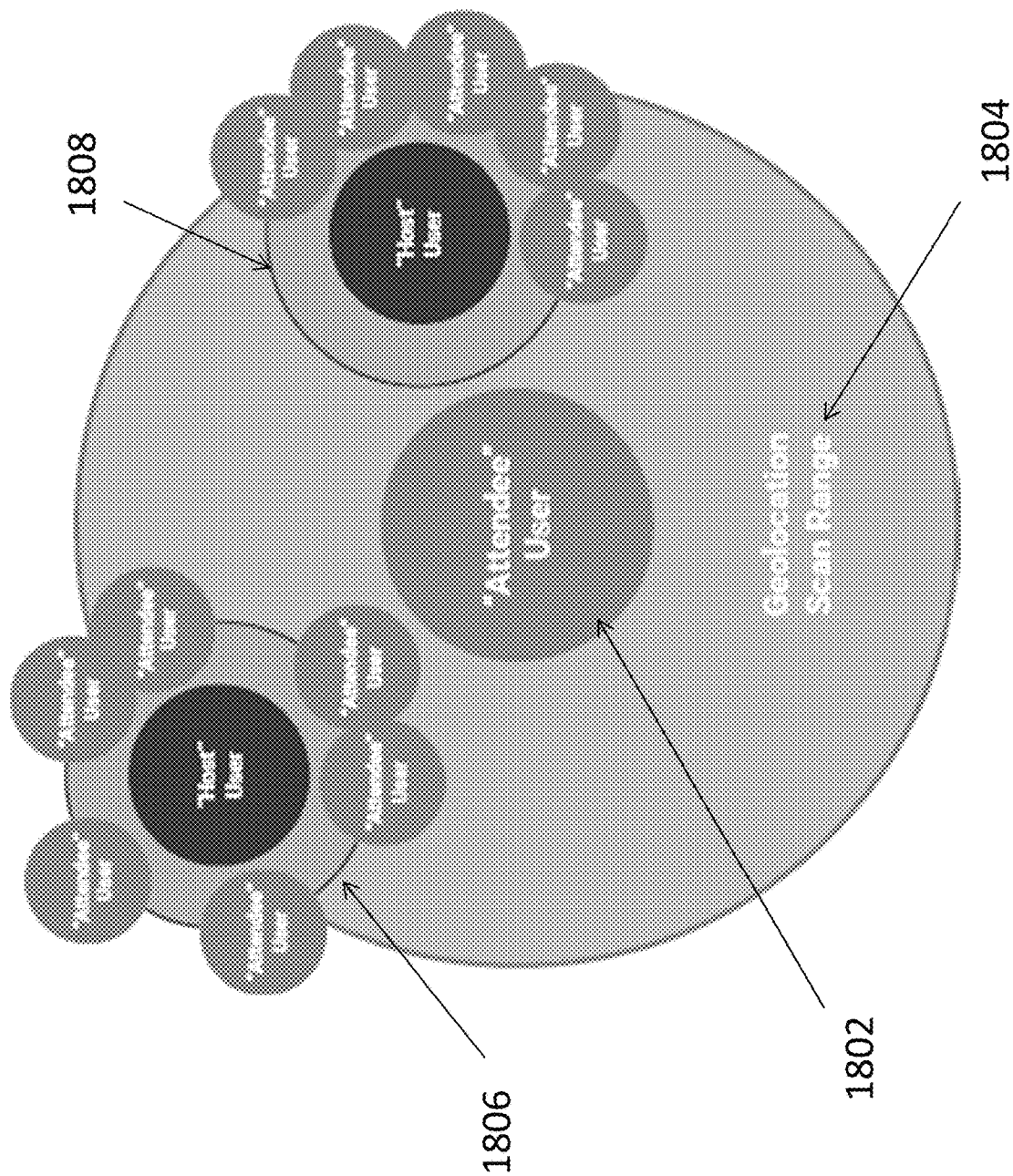
FIG. 18 is an example diagram for sharing electronic communications.

FIG. 18 is an example diagram for sharing electronic communications. As shown in FIG. 18, user 1802, using electronic application 124 on a user device (e.g., user device 112, 114, or 116), to electronically find other locations within a particular geographic (e.g., geolocation) range 1804 (e.g., within five miles, 10 miles, a particular metropolitan area, etc.). Thus, in this example diagram, electronic application 124 may determine two events, event 1806 and 1808. As shown in FIG. 18, event 1806 has six participants ("attendee" user) and a host ("host" user); and, event 1808 has five participants (as shown by five circles) and the host. In embodiments, each "attendee" user may be user using a user device (e.g., user device 112, 114, or 116) who has electronically registered with event 1806 and/or event 1808. In embodiments, the "host" user, associated with event 1806 and/or event 1808, may have electronically generated the electronic registration page for event 1806 and/or event 1808 based on one or more steps described in FIG. 3.

Figure 19:
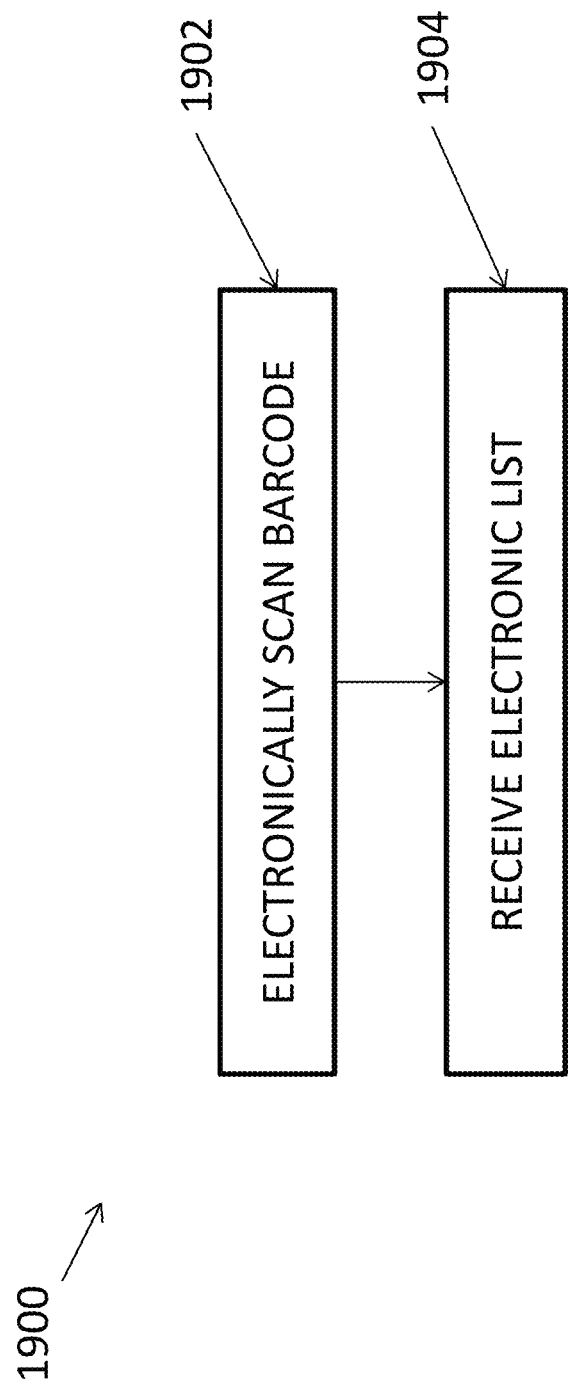
FIG. 19 is a flow chart of an example process for sending and receiving electronic communications from a user device.

FIG. 19 is a flow chart of an example process 1900 for electronically searching for an event and participating in the event. In embodiments, example process 1900 may be performed by electronic application 124 on a user device, such as user device 112, 114, or 116 as described in FIG. 1. In embodiments, example process 1900 may occur automatically or may require a user of user device 112, 114, or 116 to input electronic information into user device 112, 114, or 116 via an electronic touch screen, mouse, and/or a keyboard.

At step 1902, a user, using a user device, may electronically scan a barcode associated with a particular event. In embodiments, the user device may electronically scan the barcode via a camera associated with the user device. At step 1904, the user device may receive a list of participants that is electronically displayed on the user device via electronic application 124. In embodiments, the list may be displayed in a manner similar to the list described in FIG. 4. In embodiments, the user may electronically communicate with other users shown on the list in a manner similar to that described in FIG. 4 and/or as described in FIGS. 12-16.

Figure 20:
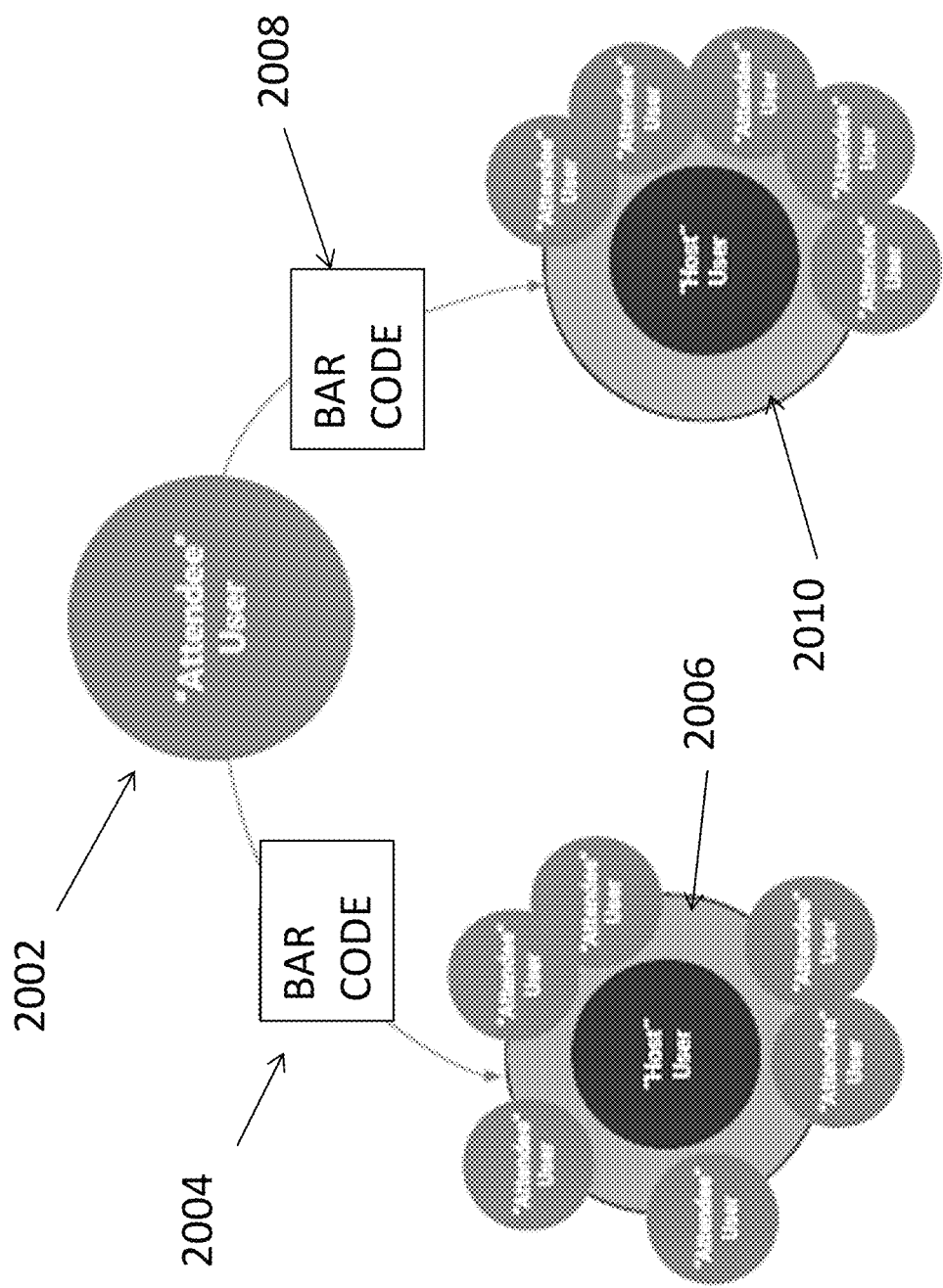
FIG. 20 is an example diagram for sharing electronic communications.

FIG. 20 is an example diagram for sharing electronic communications. As shown in FIG. 20, a user 2002, via a user device (e.g., user device 112, 114, or 116), may electronically scan barcode 2004 to electronically interact with one or more other participants (e.g., "attendee" user) via other user devices (e.g., user device 114, user device 116, etc.) associated with Event 2006 in a manner similar to that described in step 408 of FIG. 4. User 2002 may also interact, with the user device, via barcode 2008 to electronically interact with participants of Event 2010 in a manner similar to that described in step 408 in FIG. 4.

Figure 21:
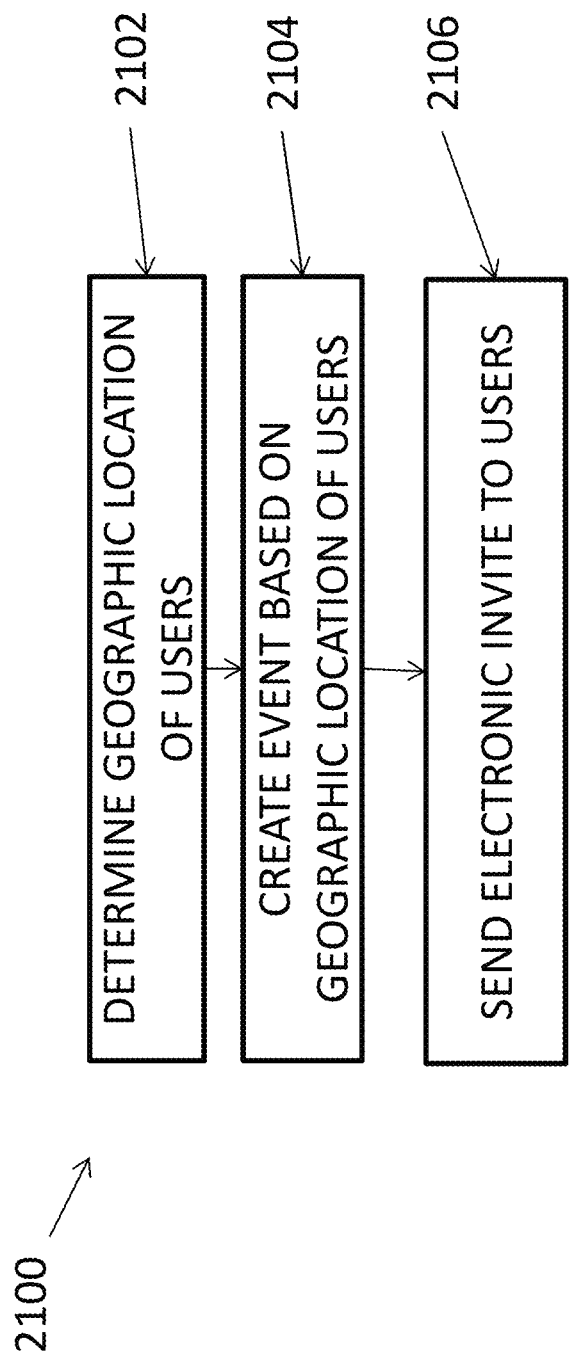
FIG. 21 is a flow chart of an example process for generating an event.

FIG. 21 is a flow chart of an example process 2100 for electronically searching for users and creating an event. In embodiments, example process 2100 may be performed by application server 118 as described in FIG. 1. In embodiments, example process 2100 may occur automatically or may require a user of user device 112, 114, or 116 to input electronic information into user device 112, 114, or 116 via an electronic touch screen, mouse, and/or a keyboard.

At step 2102, application server 118 may determine the geographic location of two of more registered users of electronic application 124. In embodiments, the users may have registered with electronic application 124 in a manner similar to that described in FIG. 3 and/or FIG. 4. In embodiments, application server 118 may interact with another computing device (e.g., GPS system) to determine the geographic location of two or more registered users of electronic application 124. In embodiments, application server 118 may determine that the event will be conducted in a non-electronic forum and, thus, the registered users should be within a particular geographic radius for travel (e.g., within one hour, two hours, etc.). In embodiments, application server 119 may determine that the event will be conducted in an electronic forum and, thus, the registered users' geographic location determines a time zone (along with date and time availability) for each user and their ability to attend to the event.

At step 2104, application server 118 may create an event based on the geographic location of the registered users. In embodiments, application server 118 may determine that two or more users are available at a particular day and time and/or their time zone, based on information stored by application server 118; or, based on information received by application server 118 (e.g., information received from an electronic calendar stored by user device 112, 114, or 116). In embodiments, application server 118 may determine based on past electronic communications that two or more users have similar interests and the type of content to be used in the event. For example, application server 118 may store information that Tom, Mary, and Jane have all registered for cooking classes. Thus, application server 118 may determine that Tom, Mary, and Jane would be interested in an event associated with cooking and create an event about cooking.

In embodiments, application server 118 may search for, or generate, content for the event. Thus, for example, Tim and Larry have an interest in real estate (based on past attendance of real estate events that have been created by registered users via electronic application 124). Application server 118 may electronically search for an electronic content (e.g., a video, webinar, etc.) about real estate and use that content for the event. In embodiments, the electronic content may be created by a registered user based on a request from application server 118 to that registered user. In embodiments, the event may only be created if a registered user decides to create content for the event and sends an electronic communication, via electronic application 124, to application server 118. In embodiments, the event may be an electronic event, a non-electronic forum, or a combination of electronic and non-electronic content.

At step 2106, application server 118 may send electronic invites to the two or more registered users. In embodiments, application server 118 may send the electronic invites as electronic communications to the two or more registered users. In embodiments, the two or more registered users may attend the event in a manner similar to that described in FIGS. 12 to 16.

Accordingly, based on one or more of the processes, methods, or systems described in FIGS. 1-21, once one user (using user device 112, user device 114, and/or user device 116) has electronically interacted with another user (using user device 112, user device 114, and/or user device 116), the electronic communication may result in additional electronic interactions between the two devices that allow electronic application 124 to synchronize one user device with other user devices so that one user device may control features of one or more other user devices. In embodiments, the synchronization may require permissions from the users, associated with the user devices, prior to the synchronization occurring.

Thus, in embodiments, the synchronization may allow one user device to electronically generate audible sound that is then generated via the speakers of another user device. For example, if one user device is generating music, the sound associated with the music may also be generated from the speakers of another user device.

In embodiments, the synchronization may allow one user device to electronically turn on one light feature that may result in another light feature in another user device to turn on at the same time and/or create a pattern of light being turned on or off. For example, the user device may send an electronic communication to another user device to turn on and off a light every 10 seconds. In embodiments, the synchronization may allow one user device to turn on and off another user's device screen if the other user device does not have a light (e.g., flashlight) feature.

In embodiments, the synchronization may allow microphone control system on one user device to control the microphone systems on another user device to work simultaneously with the speaker system of the user device to generate sound. For example, a user may speak "hello" into one user device's microphone and the audible sound may be generated by the user device's speaker and also another user device's speaker.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While various actions are described as selecting, displaying, transferring, sending, receiving, generating, notifying, and storing, it will be understood that these example actions are occurring within an electronic computing and/or electronic networking environment and may require one or more computing devices, as described in FIG. 1, to complete such actions. Furthermore, it will be understood that these various actions can be performed by using a touch screen on a computing device (e.g., touching an icon, swiping a bar or icon), using a keyboard, a mouse, or any other process for electronically selecting an option displayed on a display screen to electronically communicate with other computing devices as described in FIG. 1. Also it will be understood that any of the various actions can result in any type of electronic information to be displayed in real-time and/or simultaneously on multiple user devices (e.g., user device 112, 114, and/or 116).

It will be understood that an event may be an event that is electronically registered with electronic application 124. It will be understood any electronic action or communication performed by electronic application 124 may also include one more features associated with application server 118, application server 120, and/or user devices 112, 114, or 116. It will be understood that any electronic action or communication performed by user device 112, 114, or 116 may be performed by electronic application 124, electronic application 126, application server 118, and/or application server 120. Also it will be understood that any of the various actions can result in any type of electronic information to be displayed in real-time and/or simultaneously on multiple user devices (e.g., similar to user device 112, 114, or 116). For FIGS. 3, 4, 17, 19, and 21, the order of the blocks may be modified in other implementations. Further, non-dependent blocks may be performed in parallel.

It should also be understood that electronic communications between electronic application 124 and electronic application 126 may include the electronic transfer of electronic tokens may result in (i) the change of a value stored in a computing device, server and/or database based on one or more electronic communications, and/or (ii) the change in the amount of memory storage of electronic bits in a computing device, server and/or database based on one or more electronic communications.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An electronic communications method, comprising:
    sending, by a device, an electronic communication to a user device,
        the electronic communication including a permission to determine the user device's geographic location;
    receiving, by the device, a first electronic message from the user device,
        the first electronic message including the permission to determine the user device's geographic location;
    determining, by the device, an event is located within a particular radius of the user devices' geographic location; and
    sending, by the device, a second electronic message, to the user device, that includes information about a particular event within the particular radius of the user device's geographic location, wherein the second electronic message includes login information associated with a second electronic application, wherein the second electronic application is different than the first electronic application,
        wherein the login information is authenticated by the second electronic application based on the first electronic application sending another message to the second application;
    generating, by the device, an electronic list,
        the electronic list includes multiple identifiers;
    electronically updating, by the device, each of the multiple identifiers on the electronic list with a single value for both electronic tokens and electronic votes,
        the electronic votes are given for one or more of the multiple identifiers on the electronic list, and
        the single value for each of the multiple identifiers is electronically displayed along with the multiple identifiers of the electronic list,
        wherein the first electronic application is associated with a first identifier on the electronic list and the second electronic application is associated with a second identifier on the electronic list;
    receiving, by the device, identification information for another device, wherein the other device is associated with one of the multiple identifiers on the electronic list;
    generating, by the device, an electronic command;
    sending, by the device, the electronic command to the other device,
        wherein the electronic command synchronizes a generated light pattern displayed on the device and making a display on the other device to display the same generated light pattern at a same time as the generated light pattern displayed on the device;
        wherein the generated light pattern displayed on the other device is based on:
            the authenticating the login information by the second electronic application which is based on the first electronic application sending another message to the second application, and
            the other device is being used by a user whose is associated with a unique identifier given on the list,
                wherein the unique identifier is the second identifier, and
            wherein the device sends additional commands to the other device to change the generated light pattern into a different light pattern to be simultaneously displayed on the device and the other device; and
            wherein the generated light pattern is based on a camera flash device on the device and another camera flash device on the other device.

2. The electronic communications method of claim 1, wherein the second application is different than a first application associated with sending the other electronic communication and generating the electronic list.

3. The electronic communications method of claim 1, wherein the particular radius is based on determining the location of the user device, the location of the event, and the traveling distance between the location of the user device and the location of the event.

4. The electronic communications method of claim 1, wherein a user, associated with one of the multiple identifiers on the electronic list, electronically communicates with another user, associated with another of the multiple identifier on the electronic list.

5. The electronic communications method of claim 1, wherein the user device does not require any login information for a particular electronic application for the device

23 to request permission, via the particular electronic application, for the user device's geographic location.

6. The electronic communications method of claim 1, wherein the electronic list is stored in a database after a particular time associated with the event.

7. The electronic communications method of claim 1, further comprising:
electronically generating a graphical selection indicator associated with an identifier displayed within the electronic list;
selecting the identifier within the electronic list;
generating an electronic pop-up box based the selecting the identifier within the electronic list,
the electronic pop-up box includes electronic information that includes:
text; and
electronically send the electronic information within the electronic pop-up box to a first electronic account associated with the identifier,
where the first electronic account is associated with a particular electronic application,
where the selecting the identifier associated with the first electronic account and electronically sending the electronic information to the first electronic account requires login information associated for another identifier associated with the first electronic account but with the login information electronically inputted into a second electronic account, and
where the electronic list is displayed in the second electronic account.

8. The electronic communications method of claim 1, further comprising:
receiving, by the device, identification information for another device, wherein the other device is associated with one of the multiple identifiers on the electronic list;
generating, by the device, an electronic command;
sending, by the device, the electronic command to the other device,
wherein the electronic command synchronizes generated audible sound on the device and making speakers on the other device to generate the same audible sound.

9. A device, comprising a processor to:
receive a user device's geographic location;
discover an event that is electronically registered with an electronic application;
send a first electronic message to the user device,
the first electronic message including:
an electronic list, and
the event's geographic location, wherein the first electronic message includes login information associated with a second electronic application, wherein the second electronic application is different than the first electronic application,
wherein the login information is authenticated by the second electronic application based on the first electronic application sending a message to the second application;
update multiple identifiers on the electronic list with a single value associated with both electronic tokens and electronic votes,
the electronic votes are given for one or more of the multiple identifiers on the electronic list, and
the single value for each of the multiple identifiers is electronically displayed along with the multiple identifiers of the electronic list, wherein the first electronic application is associated with a first identifier on the electronic list and the second electronic application is associated with a second identifier on the electronic list;
generate an electronic command;
send the electronic command to the other device,
wherein the electronic command synchronizes a generated light pattern displayed on the device and making a display on the other device to display the same generated light pattern at a same time as the generated light pattern displayed on the device.

10. The device of claim 9, wherein the event is determined by analyzing the user device's geographic location and the event's geographic location.

11. The device of claim 9, wherein the event is determined by analyzing an electronic calendar associated with the user device.

12. The user device of claim 9, wherein, the processor of the device is further to:
receive an electronic instruction to select one of the multiple identifiers; and
display an electronic page associated with the selected identifier.

13. The device of claim 12, wherein the electronic page is associated with the second application and is displayed within the application.

14. The device of claim 12, wherein the selection of one of the multiple identifiers results in a change in the electronic information displayed on the electronic page.

15. The device of claim 9, wherein the event is within a particular geographic radius that is determined by analyzing the user device's geographic location and a time associated with another event electronically stored by a user device electronic calendar.

16. A non-transitory computer-readable medium storing instructions, the instructions comprising:
one or more instructions that, when executed by one or more processors, cause the one or more processors to:
send an electronic communication to a user device;
receive an electronic message from the user device, wherein the electronic message includes login information associated with a second electronic application, wherein the second electronic application is different than a first electronic application,
wherein the login information is authenticated by the second electronic application based on the first electronic application sending a message to the second application;
determine an event based on the user device's location; and
send an electronic list for display on the user device, via a first electronic application, based on determining the event;
update multiple identifiers on the electronic list with a single value associated with both electronic tokens and electronic votes,
the electronic votes are given for one or more of the multiple identifiers on the electronic list, and
the single value for each of the multiple identifiers is electronically displayed along with the multiple identifiers of the electronic list, wherein the first electronic application is associated with a first identifier on the electronic list and the second electronic application is associated with a second identifier on the electronic list;

generate, by the user device, a pattern of lights on the user device and, simultaneously, on another user device associated with the second identifier on the electronic list;

receive identification information for another device, wherein the other device is associated with one of the multiple identifiers on the electronic list;

generate an electronic command;

send the electronic command to the other device, wherein the electronic command synchronizes audible sound on the device and making speakers on the other device to generate the same audible sound at the same as the generated light pattern is displayed on the device and the other device.

17. The non-transitory computer readable medium of claim 16, wherein the electronic information includes an increase in a value associated with a number of votes displayed on the electronic page, where the number of votes is for an electronic identifier that identifies a user.

18. The non-transitory computer readable medium of claim 16, one or more further instructions that, when executed by the one or more processors, cause the one or more processors to further:

receive information about another event;

determine, based on the user device's location, that a user cannot reach the other event; and determine not to display the other event on the user device based on the user not being able to reach to the other event.

19. The non-transitory computer readable medium of claim 16, wherein the electronic list for the event does not electronically expire once the event has expired.

* * * * *